(12) United States Patent
Rodriguez et al.

(10) Patent No.: US 8,144,368 B2
(45) Date of Patent: Mar. 27, 2012

(54) AUTOMATED METHODS FOR DISTINGUISHING COPIES FROM ORIGINAL PRINTED OBJECTS

(75) Inventors: Tony F. Rodriguez, Portland, OR (US); Alastair M. Reed, Lake Oswego, OR (US); Ravi K. Sharma, Portland, OR (US); Osama M. Alattar, Tigard, OR (US); Brett T. Hannigan, Portland, OR (US); Kenneth L. Levy, Stevenson, WA (US); Hugh L. Brunk, Portland, OR (US); Geoffrey B. Rhoads, West Linn, OR (US); Ammon E. Gustafson, Beaverton, OR (US)

(73) Assignee: Digimarc Coporation, Beaverton, OH (US)

( * ) Notice: Subject to any disclaimer, the term of this patent is extended or adjusted under 35 U.S.C. 154(b) by 1951 days.

(21) Appl. No.: 10/723,181

(22) Filed: Nov. 26, 2003

(65) Prior Publication Data

US 2004/0263911 A1    Dec. 30, 2004

Related U.S. Application Data

(63) Continuation-in-part of application No. 10/165,751, filed on Jun. 6, 2002, now Pat. No. 6,754,377, which is a continuation of application No. 09/074,034, filed on May 6, 1998, now Pat. No. 6,449,377, application No.

(Continued)

(51) Int. Cl.
*H04N 1/40* (2006.01)
*G06K 9/00* (2006.01)

(52) U.S. Cl. .......... 358/3.28; 358/1.9; 358/2.1; 358/3.1; 358/1.4; 358/1.8; 358/3.01; 358/3.02; 358/3.29; 358/3.3; 358/3.31; 358/3.32; 358/1.12; 358/1.14; 358/1.15; 358/1.16; 358/1.18; 358/501; 358/505; 358/515; 358/529; 358/535; 382/100; 382/135; 382/195; 382/232; 382/284; 382/250; 382/171; 382/175; 380/22; 380/43; 380/51; 380/54; 380/201; 380/203; 380/223; 380/226; 380/228; 380/232; 380/250; 380/258; 380/278

(58) Field of Classification Search ................. 358/3.28, 358/1.9, 1.4, 1.14, 3.29, 3.3, 3.31, 3.32, 1.6, 358/1.2, 3.01, 2.99, 3.06, 517, 526, 1.15, 358/2.1; 283/113, 74; 380/28, 29; 713/176, 713/190, 191; 162/110, 309; 382/100, 112, 382/183, 237, 165, 232, 233, 135, 284, 248, 382/250, 195
See application file for complete search history.

(56) References Cited

U.S. PATENT DOCUMENTS 2,748,190 A * 5/1956 Yule .............................. 358/529
(Continued)

FOREIGN PATENT DOCUMENTS

EP           0921675        6/1999
(Continued)

OTHER PUBLICATIONS

U.S. Appl. No. 08/154,866, filed Nov. 18, 1993, Geoffrey B. Rhoads.
(Continued)

*Primary Examiner* — Steven Kau

(57) ABSTRACT

This disclosure describes methods for using embedded auxiliary signals in documents for copy detection and other applications. In on application, the auxiliary signal is formed as an array of elements selected from a set of print structures with properties that change differently in response to copy operations. These changes in properties of the print structures that carry the embedded auxiliary signal are automatically detectable. For example, the changes make the embedded auxiliary signal more or less detectable. The extent to which the auxiliary data is detected forms a detection metric used in combination with one or more other metrics to differentiate copies from originals. Examples of sets of properties of the print structures that change differently in response to copy operations include sets of colors (including different types of inks), sets of screens or dot structures that have varying dot gain, sets of structures with different aliasing effects, etc. Robust and fragile watermarks are used in Image Replacement Documents for a variety of applications. Digital watermarks act as on-board mediators in authentication of a variety of printed documents. Finally, digital watermarks are used to help manage quality of the scanners used in imaging systems.

24 Claims, 13 Drawing Sheets

Related U.S. Application Data

10/723,181, which is a continuation-in-part of application No. 10/012,703, filed on Dec. 7, 2001, now Pat. No. 6,744,906, which is a continuation of application No. 09/433,104, filed on Nov. 3, 1999, now Pat. No. 6,636,615, which is a continuation-in-part of application No. 09/234,780, filed on Jan. 20, 1999, now abandoned, application No. 10/723,181, which is a continuation-in-part of application No. 09/898,901, filed on Jul. 2, 2001, now Pat. No. 6,721,440.

(60) Provisional application No. 60/430,014, filed on Nov. 28, 2002, provisional application No. 60/440,593, filed on Jan. 15, 2003, provisional application No. 60/466,926, filed on Apr. 30, 2003, provisional application No. 60/475,389, filed on Jun. 2, 2003, provisional application No. 60/071,983, filed on Jan. 20, 1998.

(56) References Cited

U.S. PATENT DOCUMENTS

| | | | | |
|---|---|---|---|---|
| 4,884,828 | A | * | 12/1989 | Burnham et al. ............... 283/89 |
| 5,074,596 | A | * | 12/1991 | Castagnoli ...................... 283/91 |
| 5,291,243 | A | * | 3/1994 | Heckman et al. ................ 399/3 |
| 5,315,098 | A | | 5/1994 | Tow |
| 5,337,361 | A | | 8/1994 | Wang et al. |
| 5,396,559 | A | | 3/1995 | McGrew |
| 5,481,378 | A | * | 1/1996 | Sugano et al. ................ 358/501 |
| 5,488,664 | A | | 1/1996 | Shamir |
| 5,493,677 | A | | 2/1996 | Balogh et al. |
| 5,530,759 | A | | 6/1996 | Braudaway et al. |
| 5,617,119 | A | | 4/1997 | Briggs et al. |
| 5,664,018 | A | | 9/1997 | Leighton |
| 5,687,297 | A | * | 11/1997 | Coonan et al. ................. 358/1.2 |
| 5,734,752 | A | | 3/1998 | Knox |
| 5,745,604 | A | | 4/1998 | Rhoads ......................... 382/232 |
| 5,748,763 | A | | 5/1998 | Rhoads |
| 5,768,426 | A | | 6/1998 | Rhoads |
| 5,781,653 | A | * | 7/1998 | Okubo ........................... 382/135 |
| 5,790,703 | A | | 8/1998 | Wang |
| 5,824,447 | A | * | 10/1998 | Tavernier et al. ........ 430/124.13 |
| 5,850,481 | A | | 12/1998 | Rhoads |
| 5,949,055 | A | | 9/1999 | Fleet et al. |
| 5,995,638 | A | | 11/1999 | Amidror et al. |
| 6,014,453 | A | * | 1/2000 | Sonoda et al. ................. 382/137 |
| 6,026,193 | A | | 2/2000 | Rhoads |
| 6,064,764 | A | | 5/2000 | Bhaskaran et al. |
| 6,091,844 | A | * | 7/2000 | Fujii et al. ..................... 382/135 |
| 6,122,392 | A | | 9/2000 | Rhoads |
| 6,198,454 | B1 | * | 3/2001 | Sharp et al. .................... 343/773 |
| 6,198,545 | B1 | * | 3/2001 | Ostromoukhov et al. ... 358/3.09 |
| 6,233,684 | B1 | * | 5/2001 | Stefik et al. .................... 713/176 |
| 6,266,430 | B1 | | 7/2001 | Rhoads |
| 6,275,599 | B1 | | 8/2001 | Adler et al. |
| 6,285,775 | B1 | | 9/2001 | Wu et al. |
| 6,285,776 | B1 | | 9/2001 | Rhoads |
| 6,289,108 | B1 | | 9/2001 | Rhoads |
| 6,330,335 | B1 | | 12/2001 | Rhoads |
| 6,332,031 | B1 | | 12/2001 | Rhoads et al. ................. 382/100 |
| 6,343,138 | B1 | | 1/2002 | Rhoads |
| 6,345,104 | B1 | | 2/2002 | Rhoads ........................ 382/100 |
| 6,353,672 | B1 | | 3/2002 | Rhoads |
| 6,363,159 | B1 | | 3/2002 | Rhoads |
| 6,389,151 | B1 | | 5/2002 | Carr et al. |
| 6,400,827 | B1 | | 6/2002 | Rhoads |
| 6,404,898 | B1 | | 6/2002 | Rhoads |
| 6,427,020 | B1 | | 7/2002 | Rhoads |
| 6,430,302 | B2 | | 8/2002 | Rhoads |
| 6,434,322 | B1 | * | 8/2002 | Kimura et al. ................. 386/260 |
| 6,449,377 | B1 | | 9/2002 | Rhoads ........................ 382/100 |
| 6,449,379 | B1 | | 9/2002 | Rhoads |
| 6,496,591 | B1 | | 12/2002 | Rhoads |
| 6,519,352 | B2 | | 2/2003 | Rhoads |
| 6,522,771 | B2 | | 2/2003 | Rhoads |
| 6,535,618 | B1 | | 3/2003 | Rhoads |
| 6,539,095 | B1 | | 3/2003 | Rhoads |
| 6,542,618 | B1 | | 4/2003 | Rhoads |
| 6,542,620 | B1 | | 4/2003 | Rhoads |
| 6,560,349 | B1 | | 5/2003 | Rhoads |
| 6,567,534 | B1 | | 5/2003 | Rhoads |
| 6,567,535 | B2 | | 5/2003 | Rhoads |
| 6,567,780 | B2 | | 5/2003 | Rhoads |
| 6,574,350 | B1 | | 6/2003 | Rhoads et al. |
| 6,580,819 | B1 | | 6/2003 | Rhoads |
| 6,587,821 | B1 | | 7/2003 | Rhoads |
| 6,590,997 | B2 | | 7/2003 | Rhoads |
| 6,591,009 | B1 | | 7/2003 | Usami et al. |
| 6,611,599 | B2 | * | 8/2003 | Natarajan ...................... 380/203 |
| 6,636,615 | B1 | | 10/2003 | Rhoads et al. ................. 382/100 |
| 6,647,129 | B2 | | 11/2003 | Rhoads |
| 6,654,480 | B2 | | 11/2003 | Rhoads |
| 6,654,887 | B2 | | 11/2003 | Rhoads |
| 6,675,146 | B2 | | 1/2004 | Rhoads |
| 6,690,811 | B2 | | 2/2004 | Au et al. |
| 6,721,440 | B2 | | 4/2004 | Reed et al. |
| 6,724,912 | B1 | | 4/2004 | Carr et al. |
| 6,738,495 | B2 | | 5/2004 | Rhoads et al. |
| 6,744,906 | B2 | | 6/2004 | Rhoads et al. |
| 6,744,907 | B2 | | 6/2004 | Rhoads |
| 6,750,985 | B2 | | 6/2004 | Rhoads |
| 6,754,377 | B2 | | 6/2004 | Rhoads |
| 6,757,406 | B2 | | 6/2004 | Rhoads |
| 6,768,808 | B2 | | 7/2004 | Rhoads |
| 6,771,796 | B2 | | 8/2004 | Rhoads |
| 6,778,682 | B2 | | 8/2004 | Rhoads |
| 6,782,116 | B1 | | 8/2004 | Zhao et al. |
| 6,785,815 | B1 | | 8/2004 | Serret-Avila et al. |
| 6,804,379 | B2 | | 10/2004 | Rhoads |
| 6,834,344 | B1 | | 12/2004 | Aggarwal et al. |
| 6,882,738 | B2 | | 4/2005 | Davis et al. |
| 6,940,995 | B2 | | 9/2005 | Choi et al. |
| 6,944,298 | B1 | | 9/2005 | Rhoads |
| 6,959,100 | B2 | | 10/2005 | Rhoads |
| 6,959,386 | B2 | | 10/2005 | Rhoads |
| 6,970,259 | B1 | | 11/2005 | Lunt et al. |
| 6,970,573 | B2 | | 11/2005 | Carr et al. |
| 6,978,036 | B2 | | 12/2005 | Alattar et al. |
| 6,983,051 | B1 | | 1/2006 | Rhoads |
| 6,987,862 | B2 | | 1/2006 | Rhoads |
| 6,993,152 | B2 | | 1/2006 | Patterson et al. |
| 7,003,132 | B2 | | 2/2006 | Rhoads |
| 7,017,045 | B1 | | 3/2006 | Krishnamachari |
| 7,020,285 | B1 | | 3/2006 | Kirovski |
| 7,027,189 | B2 | * | 4/2006 | Umeda ......................... 358/3.03 |
| 7,046,808 | B1 | | 5/2006 | Metois et al. |
| 7,054,461 | B2 | * | 5/2006 | Zeller et al. ................... 382/100 |
| 7,054,462 | B2 | | 5/2006 | Rhoads et al. |
| 7,054,463 | B2 | | 5/2006 | Rhoads et al. |
| 7,076,084 | B2 | | 7/2006 | Davis et al. |
| 7,113,615 | B2 | | 9/2006 | Rhoads et al. |
| 7,130,087 | B2 | | 10/2006 | Rhoads |
| 7,171,020 | B2 | | 1/2007 | Rhoads et al. ................. 382/100 |
| 7,181,022 | B2 | | 2/2007 | Rhoads |
| 7,184,570 | B2 | | 2/2007 | Rhoads |
| 7,239,734 | B2 | | 7/2007 | Alattar et al. |
| 7,242,790 | B2 | | 7/2007 | Rhoads |
| 7,263,203 | B2 | | 8/2007 | Rhoads et al. |
| 7,266,217 | B2 | | 9/2007 | Rhoads et al. |
| 7,269,275 | B2 | | 9/2007 | Carr et al. |
| 7,286,684 | B2 | | 10/2007 | Rhoads et al. |
| 7,286,685 | B2 | | 10/2007 | Brunk et al. ................... 382/100 |
| 7,305,117 | B2 | | 12/2007 | Davis et al. |
| 7,313,253 | B2 | | 12/2007 | Davis et al. |
| 7,321,667 | B2 | | 1/2008 | Stach |
| 7,340,076 | B2 | | 3/2008 | Stach et al. |
| 7,359,528 | B2 | | 4/2008 | Rhoads |
| 7,372,976 | B2 | | 5/2008 | Rhoads et al. |
| 7,400,743 | B2 | | 7/2008 | Rhoads et al. |
| 7,415,129 | B2 | | 8/2008 | Rhoads |
| 7,418,111 | B2 | | 8/2008 | Rhoads |
| 7,424,132 | B2 | | 9/2008 | Rhoads |
| 7,446,891 | B2 | | 11/2008 | Haas et al. |

| | | |
|---|---|---|
| 7,499,564 B2 | 3/2009 | Rhoads |
| 7,532,741 B2 | 5/2009 | Stach |
| 7,536,555 B2 | 5/2009 | Rhoads |
| 7,537,170 B2 | 5/2009 | Reed et al. |
| 7,539,325 B2 | 5/2009 | Rhoads et al. |
| 7,548,643 B2 | 6/2009 | Davis et al. |
| 7,555,139 B2 | 6/2009 | Rhoads et al. |
| 7,567,686 B2 | 7/2009 | Rhoads |
| 7,570,784 B2 | 8/2009 | Alattar |
| 7,602,940 B2 | 10/2009 | Rhoads et al. |
| 7,602,977 B2 | 10/2009 | Rhoads et al. |
| 7,606,390 B2 | 10/2009 | Rhoads |
| 7,639,837 B2 | 12/2009 | Carr et al. |
| 7,672,477 B2 | 3/2010 | Rhoads |
| 7,676,059 B2 | 3/2010 | Rhoads |
| 7,702,511 B2 | 4/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,778,437 B2 | 8/2010 | Rhoads et al. |
| 7,796,826 B2 | 9/2010 | Rhoads et al. |
| 7,831,062 B2 | 11/2010 | Stach |
| 2001/0020270 A1 | 9/2001 | Yeung et al. |
| 2001/0022848 A1 | 9/2001 | Rhoads |
| 2001/0030759 A1 * | 10/2001 | Hayashi et al. ............... 358/1.9 |
| 2001/0047478 A1 | 11/2001 | Mase |
| 2002/0031240 A1 | 3/2002 | Levy et al. |
| 2002/0037093 A1 | 3/2002 | Murphy |
| 2002/0054355 A1 | 5/2002 | Brunk |
| 2002/0054692 A1 * | 5/2002 | Suzuki et al. ............... 382/100 |
| 2002/0061121 A1 | 5/2002 | Rhoads et al. |
| 2002/0061122 A1 | 5/2002 | Fujihara et al. |
| 2002/0076082 A1 | 6/2002 | Arimura et al. |
| 2002/0080995 A1 | 6/2002 | Rhoads |
| 2002/0095577 A1 | 7/2002 | Nakamura et al. |
| 2002/0099943 A1 | 7/2002 | Rodriguez et al. |
| 2002/0106102 A1 | 8/2002 | Au et al. |
| 2002/0114456 A1 | 8/2002 | Sako |
| 2002/0126842 A1 | 9/2002 | Hollar |
| 2002/0136429 A1 | 9/2002 | Stach et al. |
| 2002/0144130 A1 | 10/2002 | Rosner et al. |
| 2002/0150246 A1 | 10/2002 | Ogino |
| 2002/0176114 A1 | 11/2002 | Zeller et al. |
| 2002/0178368 A1 | 11/2002 | Yin et al. |
| 2002/0181732 A1 | 12/2002 | Safavi-Naini et al. |
| 2003/0021440 A1 | 1/2003 | Rhoads |
| 2003/0033529 A1 | 2/2003 | Ratnakar et al. |
| 2003/0081779 A1 | 5/2003 | Ogino |
| 2003/0099374 A1 | 5/2003 | Choi et al. |
| 2003/0138128 A1 | 7/2003 | Rhoads |
| 2003/0156733 A1 | 8/2003 | Zeller et al. |
| 2004/0057581 A1 | 3/2004 | Rhoads |
| 2004/0075869 A1 * | 4/2004 | Hilton et al. ............... 358/3.28 |
| 2004/0091131 A1 | 5/2004 | Honsinger et al. |
| 2004/0145661 A1 | 7/2004 | Murakami et al. |
| 2004/0181671 A1 | 9/2004 | Brundage et al. |
| 2005/0111027 A1 | 5/2005 | Cordery et al. |
| 2005/0114668 A1 | 5/2005 | Haas et al. |
| 2006/0028689 A1 | 2/2006 | Perry et al. |
| 2006/0062386 A1 | 3/2006 | Rhoads |
| 2006/0075240 A1 | 4/2006 | Kalker et al. |
| 2007/0016790 A1 | 1/2007 | Brundage et al. |
| 2007/0172097 A1 | 7/2007 | Rhoads et al. |
| 2007/0172098 A1 | 7/2007 | Rhoads |
| 2007/0180251 A1 | 8/2007 | Carr |
| 2007/0201835 A1 | 8/2007 | Rhoads |
| 2008/0131083 A1 | 6/2008 | Rhoads |
| 2008/0131084 A1 | 6/2008 | Rhoads |
| 2008/0149713 A1 | 6/2008 | Rhoads et al. |
| 2008/0253740 A1 | 10/2008 | Rhoads |
| 2008/0275906 A1 | 11/2008 | Rhoads |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |

FOREIGN PATENT DOCUMENTS

| | | |
|---|---|---|
| EP | 0961239 | 12/1999 |
| EP | 1202250 | 5/2002 |
| GB | 351 960 | 6/1931 |
| WO | WO 02/25599 | 3/2002 |
| WO | WO 0250773 | 6/2002 |
| WO | WO 02056264 | 7/2002 |
| WO | WO 02059712 | 8/2002 |
| WO | WO 02084990 | 10/2002 |
| WO | WO 02089057 | 11/2002 |

OTHER PUBLICATIONS

U.S. Appl. No. 08/215,289, filed Mar. 17, 1994, Geoffrey B. Rhoads.
U.S. Appl. No. 09/150,147, filed Mar. 9, 1998, Geoffrey B. Rhoads.
U.S. Appl. No. 09/151,492, filed Sep. 11, 1998, Bruce L. Davis; Geoffrey B. Rhoads.
U.S. Appl. No. 09/496,380, filed Feb. 2, 2000, Geoffrey B. Rhoads.
U.S. Appl. No. 12/881,911, filed Sep. 14, 2010, Geoffrey B. Rhoads; J. Scott Carr.
European Search Report on EP Application 10181427.5, completed Jun. 21, 2011.

* cited by examiner

| 1 | 1 | 1 | 0 | 1 | 0 | 0 |
| 1 | 0 | 1 | 0 | 0 | 1 | 1 |
| 0 | 1 | 1 | 0 | 0 | 1 | 0 |
| 0 | 1 | 0 | 1 | 1 | 1 | 0 |
| 1 | 0 | 1 | 1 | 0 | 0 | 1 |

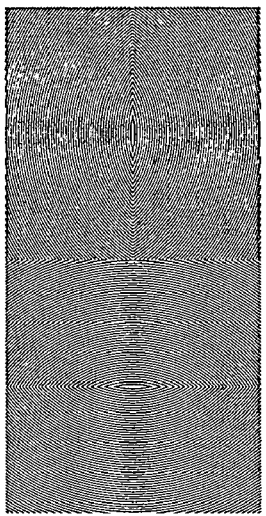
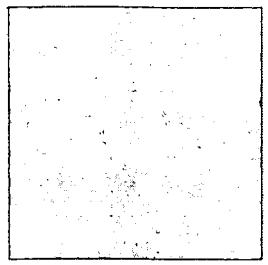
Fig. 7
Fig. 8
Fig. 9
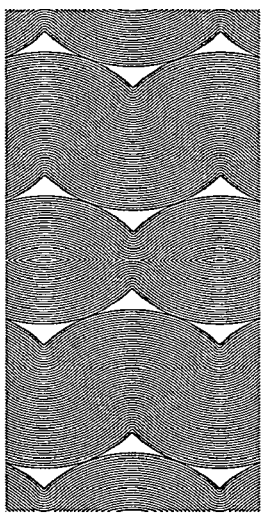
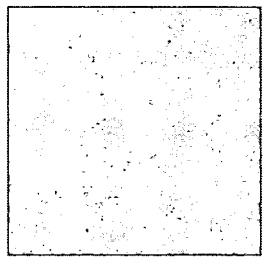
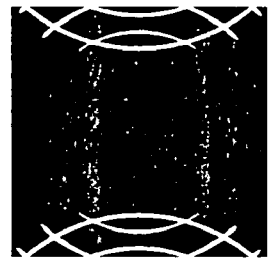
Fig. 11
Fig. 12A
Fig. 10
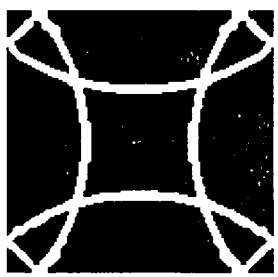
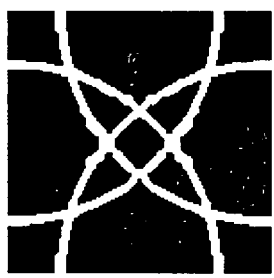
Fig. 12B
Fig. 12C

AUTOMATED METHODS FOR DISTINGUISHING COPIES FROM ORIGINAL PRINTED OBJECTS

RELATED APPLICATION DATA

This patent application claims priority to U.S. Provisional Application Nos. 60/430,014, filed Nov. 28, 2002, 60/440,593, filed Jan. 15, 2003, 60/466,926, filed Apr. 30, 2003 and 60/475,389, filed Jun. 2, 2003, which are hereby incorporated by reference.

This patent application is also a continuation in part of Ser. No. 10/165,751, filed Jun. 6, 2002, which is a continuation of Ser. No. 09/074,034, filed May 6, 1998 (now U.S. Pat. No. 6,449,377.

This patent application is also a continuation in part of Ser. No. 10/012,703, filed Dec. 7, 2001, which is a continuation of Ser. No. 09/433,104, filed Nov. 3, 1999. (now U.S. Pat. No. 6,636,615), which is a continuation in part of Ser. No. 09/234,780, filed Jan. 20, 1999 (now abandoned), which claims priority to 60/071,983, filed Jan. 20, 1998.

This patent application is also a continuation in part of Ser. No. 09/898,901, filed Jul. 2, 2001.

This application is related to U.S. Pat. Nos. 6,332,031 and 6,449,377, U.S. application Ser. No. 09/938,870, filed Aug. 23, 2001, Ser. No. 09/731,456, filed Dec. 6, 2000, Ser. No. 10/052,895, filed Jan. 17, 2002, Ser. No. 09/840,016, filed Apr. 20, 2001, and International Application PCT/US02/20832, filed Jul. 1, 2002. The above patents and applications are hereby incorporated by reference.

TECHNICAL FIELD

The invention relates to counterfeit detection, embedded signaling in printed matter for authentication, and digital watermarking.

BACKGROUND AND SUMMARY

The advances in digital imaging and printing technologies have vastly improved desktop publishing, yet have provided counterfeiters with lower cost technologies for illegally counterfeiting security and value documents, like identity documents, banknotes, checks, etc. While there are many technologies that make counterfeiting more difficult, there is a need for technologies that can quickly and accurately detect copies. Preferably, these technologies should integrate with existing processes for handling the value documents. For example, in the case of value documents like checks, there is a need for copy detection technology that integrates within the standard printing and validation processes in place today. Further, as paper checks are increasingly being scanned and processed in the digital realm, anti-counterfeiting technologies need to move into this realm as well.

One promising technology for automated copy detection is digital watermarking. Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

In the case of value documents, digital watermarking can be applied to printed objects for copy detection. In some applications, the digital watermarking techniques can be generalized to auxiliary data embedding methods that can be used to create designed graphics, features or background patterns on value documents that carry auxiliary data. These more general data embedding methods creates printable image features that carry auxiliary data covertly, yet are not necessarily invisible. They afford the flexibility to create aesthetically pleasing graphics or unobtrusive patterns that carry covert signals used to authenticate the printed object and distinguish copies from originals.

Auxiliary data embedding systems for documents typically have two primary components: an encoder that embeds the auxiliary signal in a host document image, and a decoder that detects and reads the embedded auxiliary signal from a document. The encoder embeds the auxiliary signal by subtly altering an image to be printed on the host signal or generating an image carrying the auxiliary data. The reading component analyzes a suspect image scanned from the document to detect whether an auxiliary signal is present, and if so, extracts information carried in it.

Several particular digital watermarking and related auxiliary data embedding techniques have been developed for print media. The reader is presumed to be familiar with the literature in this field. Particular techniques for embedding and detecting imperceptible digital watermarks in media signals are detailed in the assignee's U.S. Pat. Nos. 6,614,914 and 6,122,403, which are hereby incorporated by reference.

This disclosure describes methods for using embedded auxiliary signals in documents for copy detection. The auxiliary signal is formed as an array of elements selected from a set of print structures with properties that change differently in response to copy operations. These changes in properties of the print structures that carry the embedded auxiliary signal are automatically detectable. For example, the changes make the embedded auxiliary signal more or less detectable. The extent to which the auxiliary data is detected forms a detection metric used in combination with one or more other metrics to differentiate copies from originals. Examples of sets of properties of the print structures that change differently in response to copy operations include sets of colors (including different types of inks), sets of screens or dot structures that have varying dot gain, sets of structures with different aliasing effects, sets of structures with different frequency domain attributes, etc.

Further features will become apparent with reference to the following detailed description and accompanying drawings.

In this case, the set includes two different types of screens that have similar gray level as a result of similar ink coverage per unit area. However, the structure with smaller dots has greater dot gain.

FIG. 7 is a diagram illustrating an example of a print feature for copy detection comprising curved line structures.

FIG. 8 is a diagram of a frequency domain transform of the feature in FIG. 7.

FIG. 9 is a diagram of mask used to measure energy of the print feature of FIG. 7 in the frequency domain.

FIG. 10 is diagram illustrating another example of a print feature for copy detection comprising curved line structures.

FIG. 11 is a diagram of a frequency domain transform of the feature in FIG. 10.

FIGS. 12A-C are diagrams of masks used to measure energy of the print features in the frequency domain.

Figure 13:
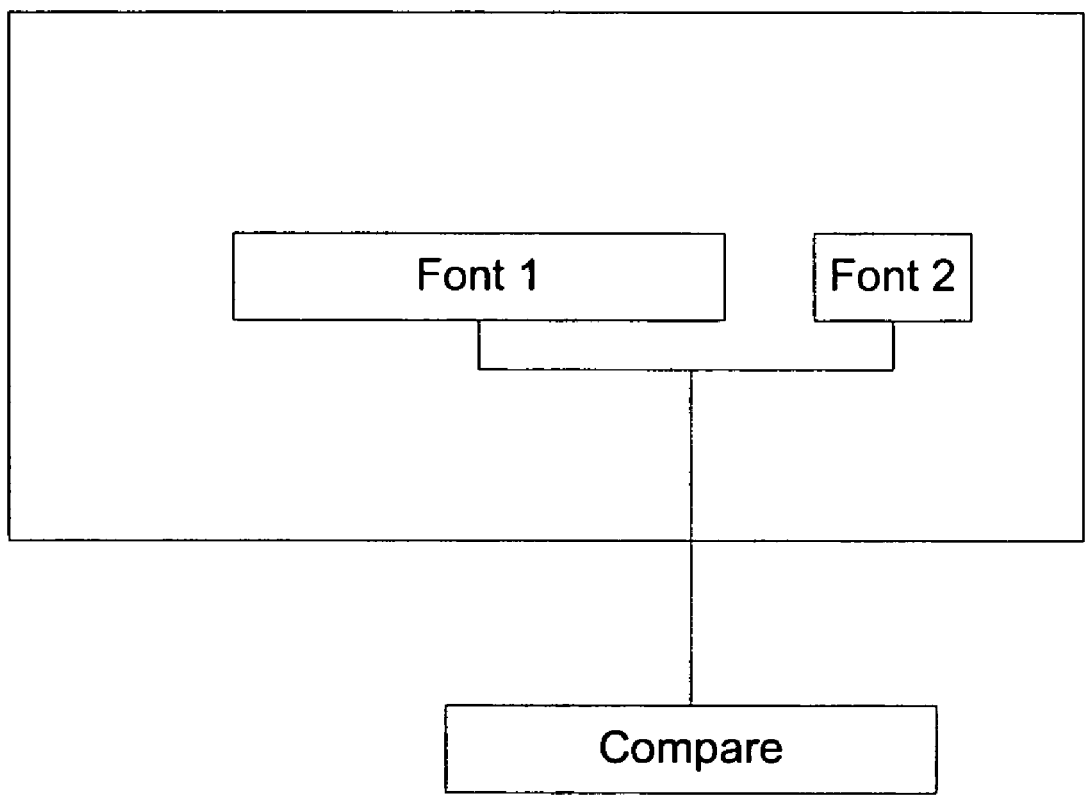

FIG. 13 is a diagram illustrating a method for authenticating a document by comparing features at two or more different locations on the document.

Figure 14:
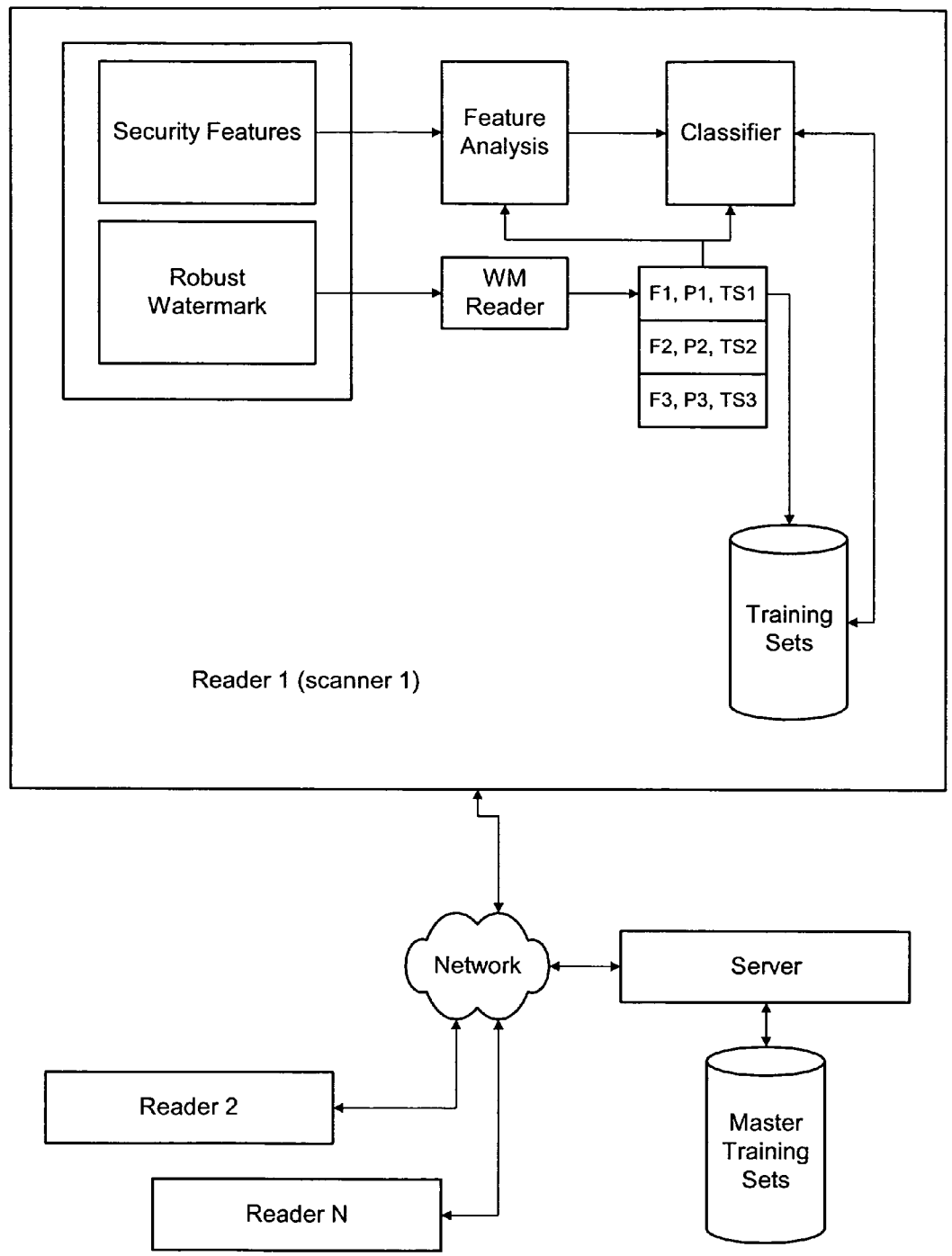

FIG. 14 is a diagram of a system for document authentication in which information extracted from a robust watermark is used to set up a classifier.

Figure 15:
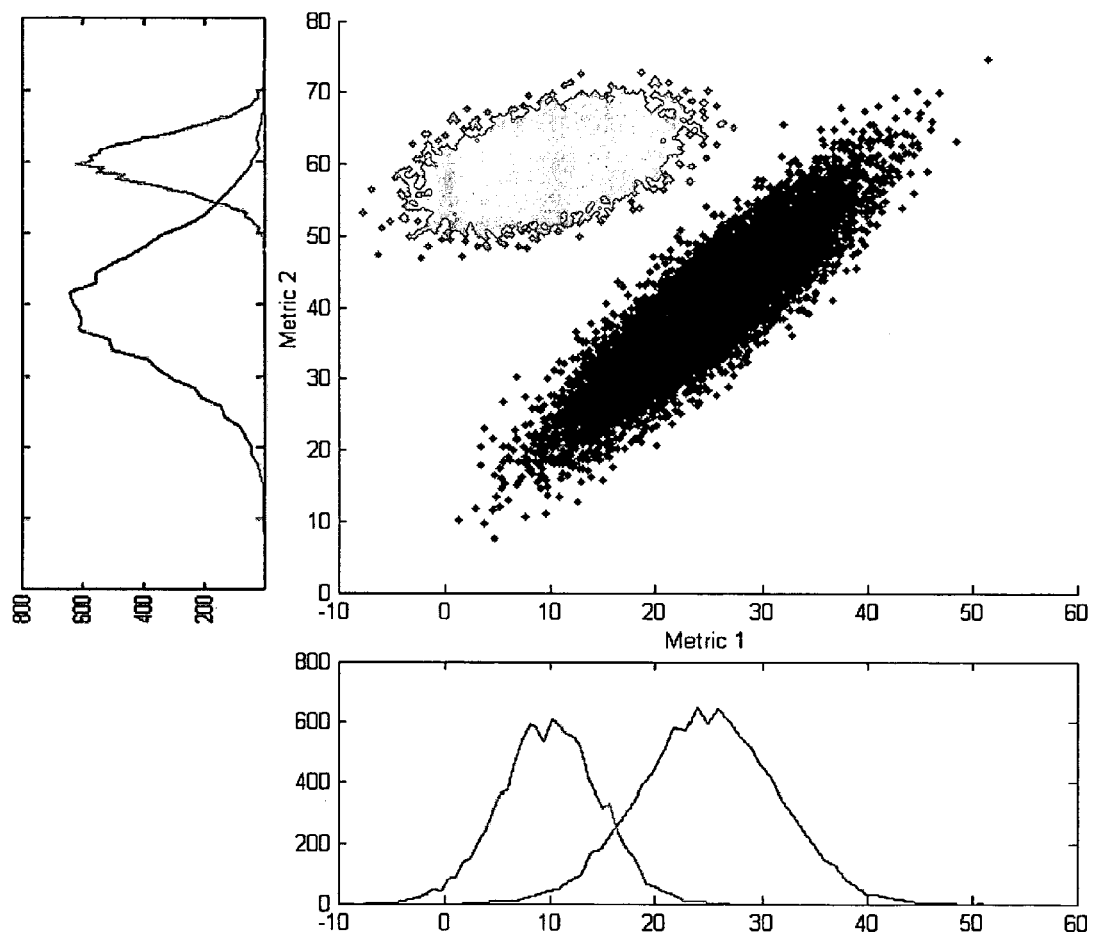

FIG. 15 is a diagram used to illustrate a classifier used to discern originals from one or more types of counterfeits.

Figure 16:
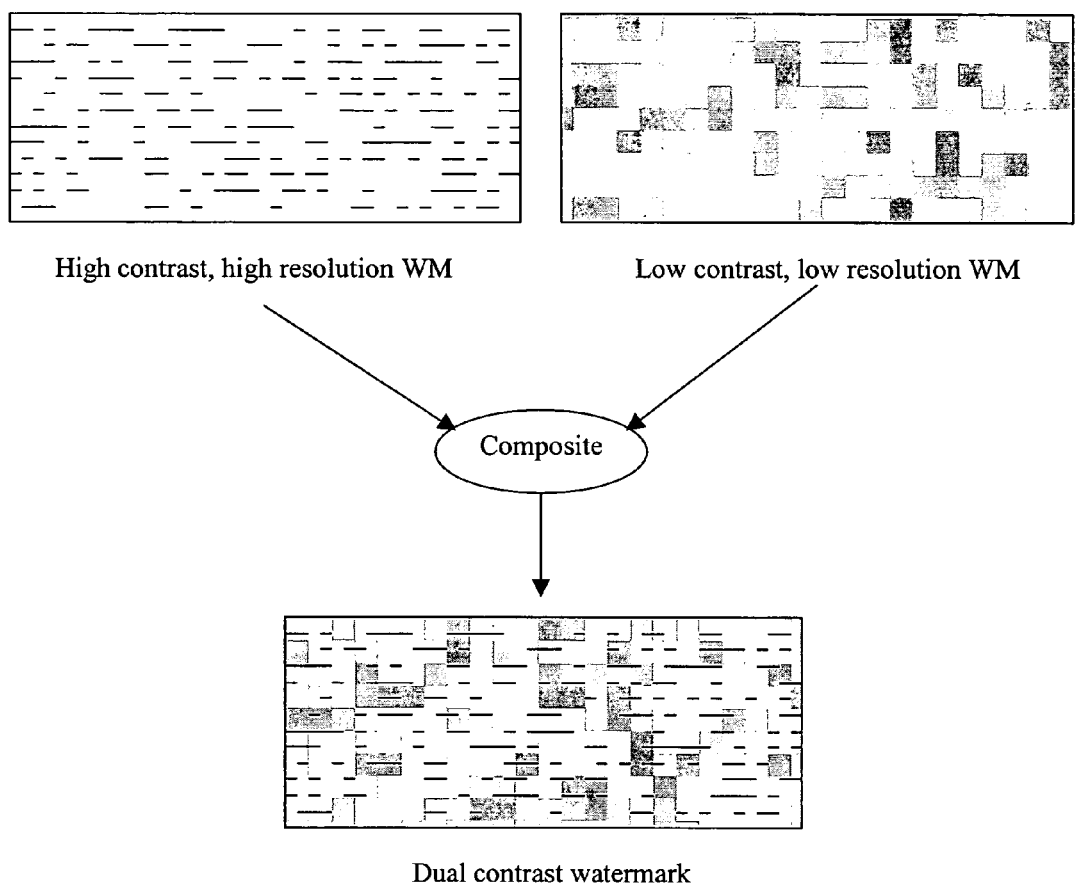

FIG. 16 is a diagram illustrating an example of dual contrast watermarks.

Figure 17:
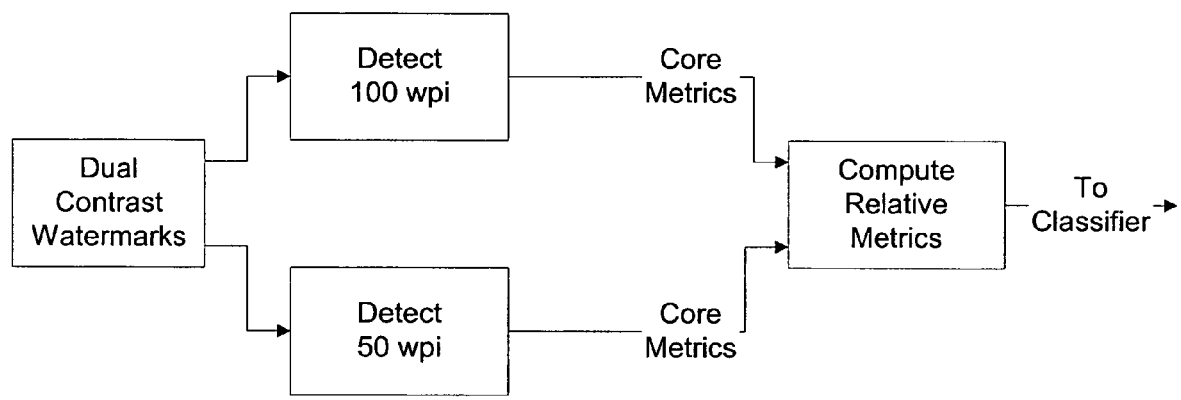

FIG. 17 is a diagram illustrating a method used in a reader system for evaluating metrics from dual contrast watermarks.

Figure 18:
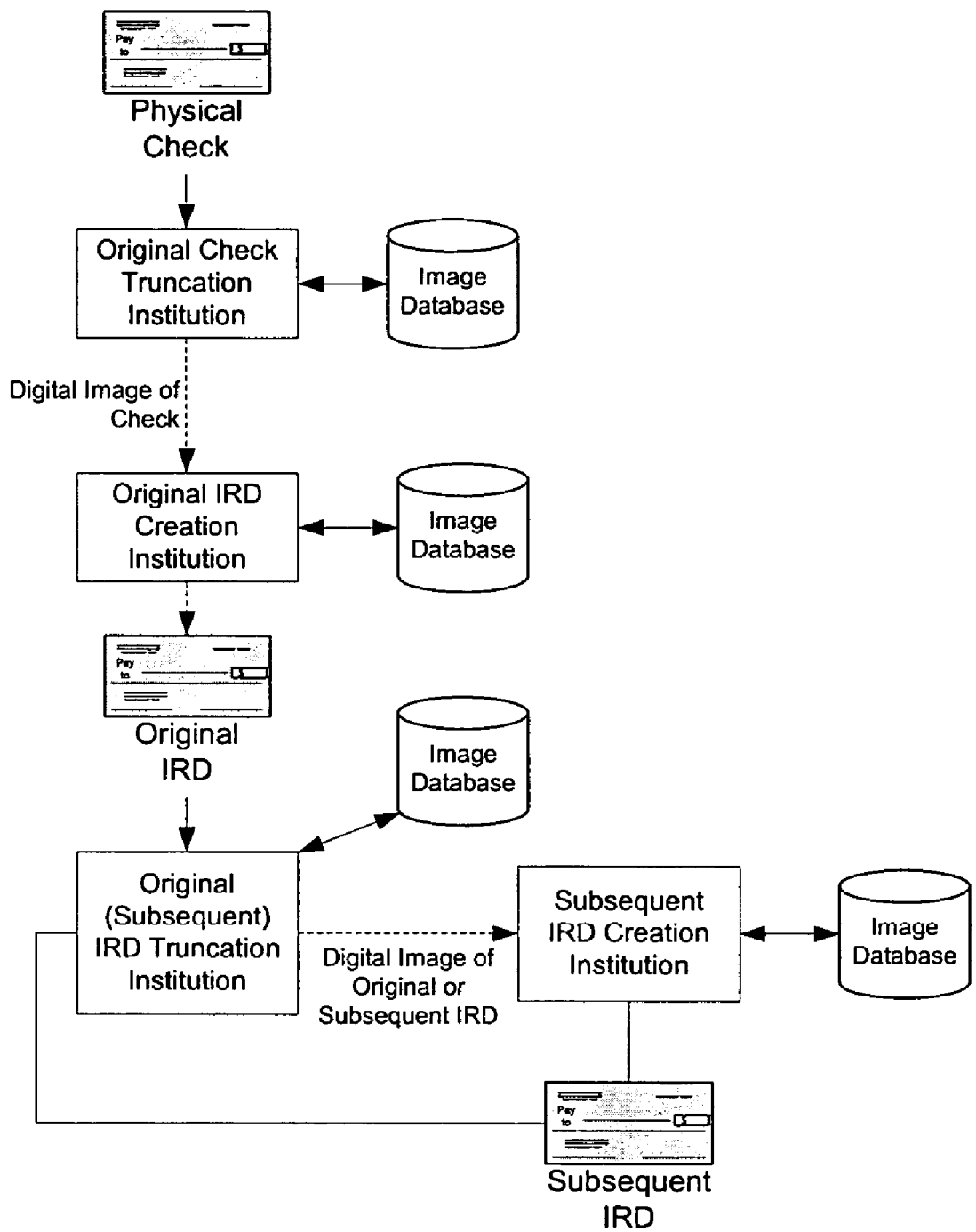

FIG. 18 is a diagram illustrating a system for processing Image Replacement Documents to show how digital watermarks may be integrated into such a system.

Figure 19:
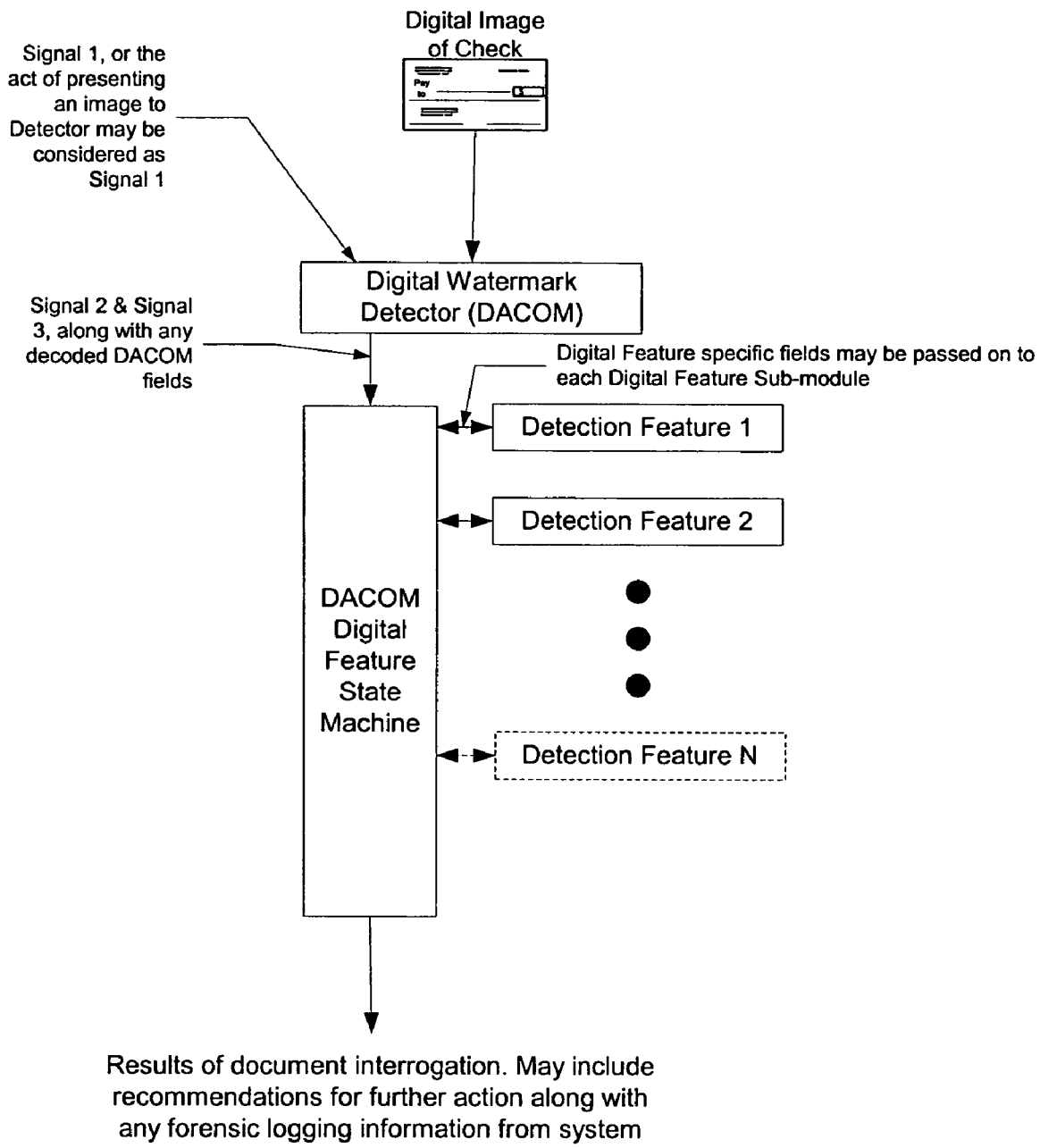

FIG. 19 is a diagram illustrating architecture using digital watermarks on documents as on-board mediators for authentication.

Figure 20:
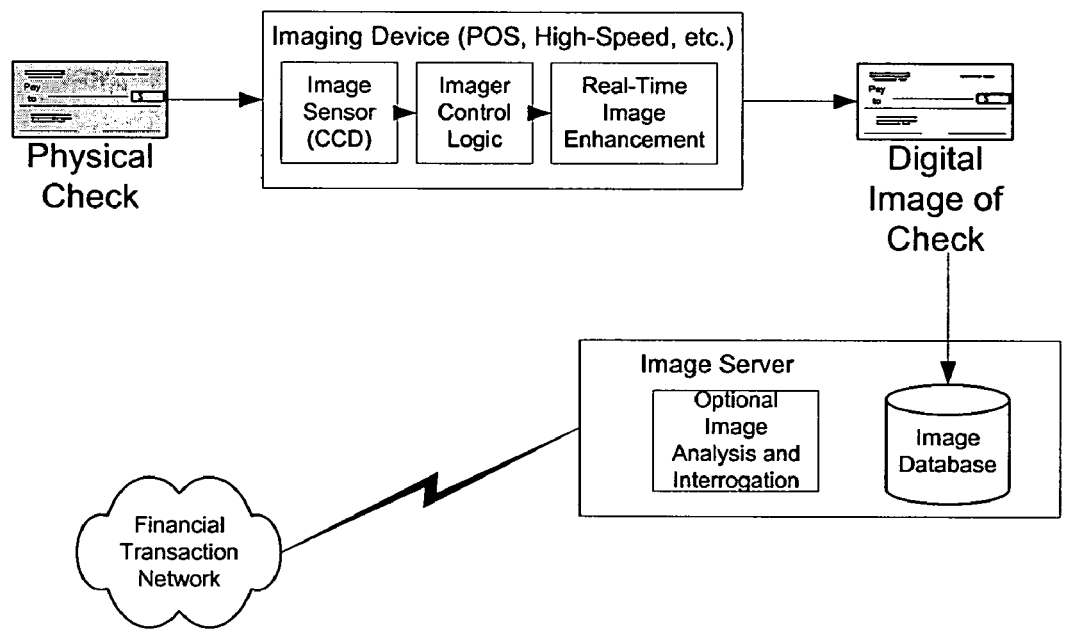

FIG. 20 is a diagram illustrating a document imaging system to show how the architecture of FIG. 19 may be integrated into such a system.

DETAILED DESCRIPTION

The following sections describe various automated techniques for distinguishing a copy from an original.

Auxiliary Signal Generation, Embedding and Detection

Figure 1:
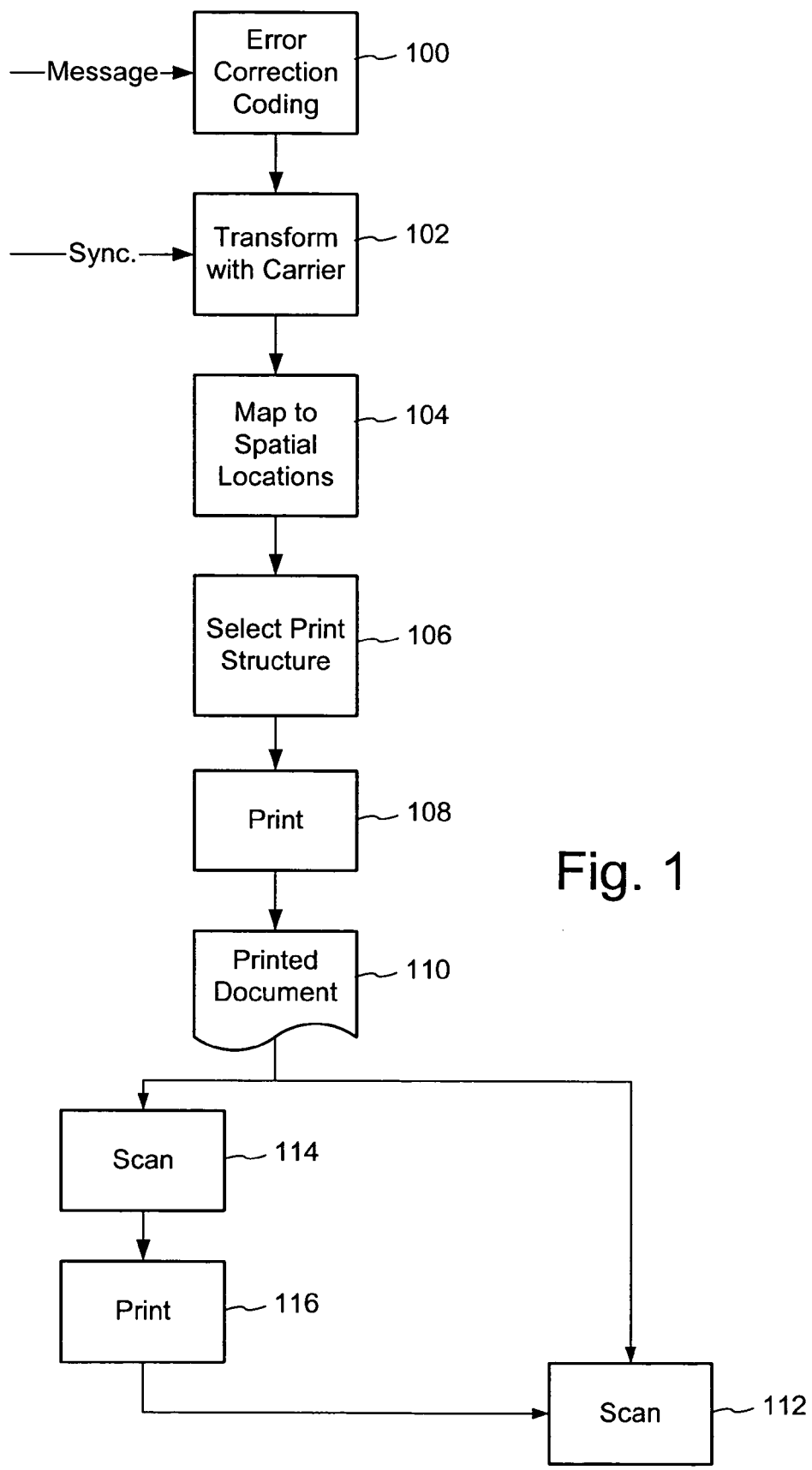
FIG. 1 illustrates a process for generating an auxiliary data signal for printing on print media for authentication.

FIG. 1 illustrates a process for generating an auxiliary data signal for printing on print media for authentication. This process is similar to digital watermark generation of certain embodiments described in U.S. application Ser. No. 09/503, 881 and U.S. Pat. No. 6,122,403. In copy detection applications for value documents, there is often greater flexibility in designing the structure of the digital watermark signal because there is flexibility in the artwork of the document, and the digital watermark need not be hidden in a fixed pre-existing image. Instead, the signal can be designed to have a particular, unobtrusive style and structure, such as a graphic or background pattern that itself forms its own image with embedded data. In one implementation, the structure of the signal appears as collection of lines of varying length, but the signal may also be formed of other structures (e.g., different halftone screen elements, varying line widths, varying dot sizes and shapes, etc.)

The auxiliary data signal carries a message. This message may include one or more fixed and variable parts. The fixed parts can be used to facilitate detection, avoid false positives, and enable error measurement as an authentication metric of the printed article. The variable parts can carry variety of information, such as unique identifier (e.g., serving to index relating data in a database), authentication information such as data or feature metrics (or hash of same) on the printed object, and error detection information computed as a function of the other message elements.

The auxiliary signal generator of FIG. 1 performs error correction coding (100) on the message to make it more robust. Examples include block codes (e.g., BCH codes), convolutional codes, turbo codes, M-ary modulation, and combinations of these coding methods (e.g., concatenated codes). Next, the signal generator transforms the error correction coded message with a carrier signal (102). One example is to spread it over a pseudorandom sequence through multiplication, XOR, or convolution. For example, each element of the error correction coded signal is spread over N corresponding elements of the carrier signal.

Some form of geometric synchronization signal may be formed with the auxiliary signal at this stage or subsequent stages. One example is formation of the signal such that it has detectable registration peaks in a transform domain, such as a spatial frequency domain, convolution domain and/or correlation domain.

As part of the signal generation process, the auxiliary signal generator maps the elements of the signal to spatial locations of a target print object (104). These locations form a tiled pattern of rectangular arrays, such as the small array shown in FIG. 3, or some other geometric pattern. This mapping may be used to structure the auxiliary signal into a pattern of blocks or other shapes that produce detectable energy peaks in the convolution, autocorrelation, frequency (e.g., FFT magnitude) or some other transform domain. These detectable energy peaks may be used as the geometric synchronization signal. Further, by replicating the auxiliary signal over this pattern, the repetitions inherent in this process can be used to enhance the robustness of the message (as a form of repetition coding that is exploited in the auxiliary data reader), and make the message detectable in small excerpts of the printed document where it is repeated (e.g., robust to cropping).

Figures 3, 4:
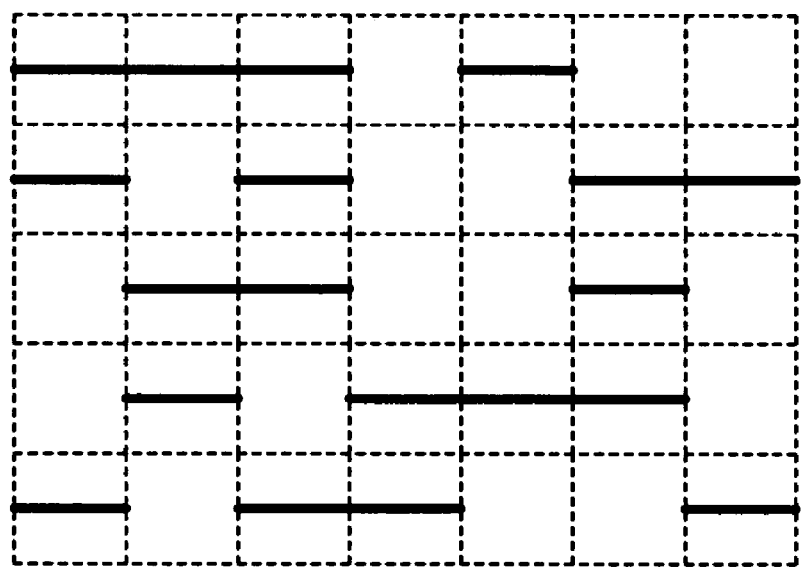
FIG. 3 is a diagram illustrating an example of an auxiliary data signal in binary form.
FIG. 4 is a diagram illustrating how the auxiliary signal of FIG. 3 can be mapped to different types of print structures, such as line structures, to embed the auxiliary signal into a printed image.

At this point, the auxiliary signal comprises an array of binary or multilevel values (i.e. more than two binary states) at each spatial location. For the sake of explanation, we will refer to these locations as embedding locations. FIG. 3 shows an example of an array of embedding locations, with binary values of the auxiliary signal mapped to each of the locations. If the signal is multilevel, it may be thresholded to generate a binary signal if desired.

Figure 5:
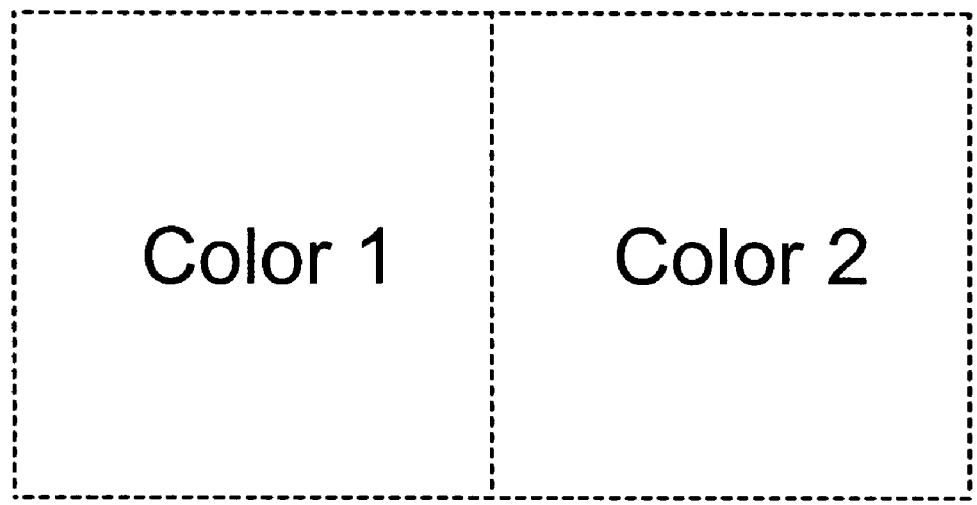
FIG. 5 illustrates an example of a set of properties of a print structure that respond differently to copy operations. In this case, the set includes two different colors, color 1 and color 2.

Next, the signal generator selects a print structure for each embedding location (106). One can consider the signal value at the embedding location as an index to the desired print structure. This print structure may be selected from a set of possible print structures. One simple set for the binary state is the presence or absence of an ink dot, line or other shape. FIG. 4 for example, shows a case where the binary value 1 maps to the presence of a line structure, while the binary value 0 maps to the absence of the line structure. Other examples of binary states include, for example, a structure at color 1 (e.g., using ink 1) and a structure at color 2 (e.g., using ink 2) as shown in FIG. 5.

Figure 6:
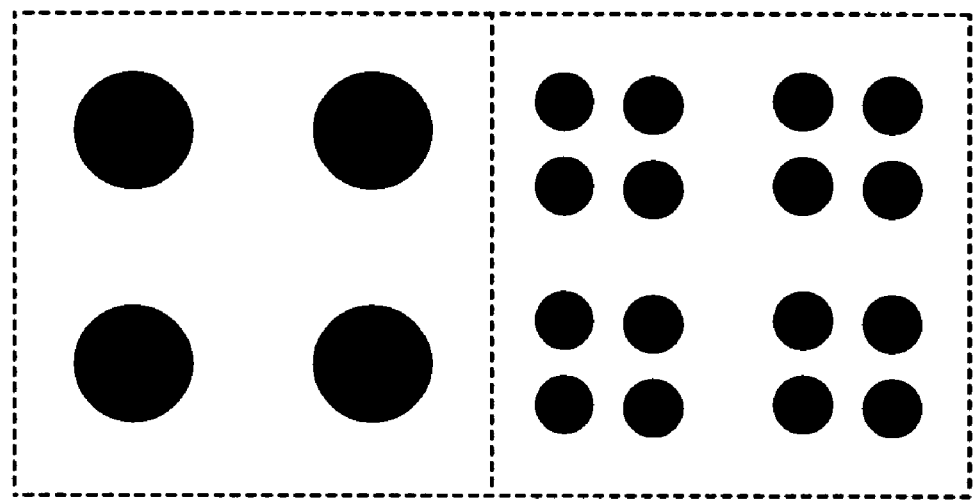
FIG. 6 illustrates another example of a set of properties of a print structure that respond differently to copy operations.

Another example is a first structure at dot pattern or halftone screen 1 and a second structure at dot pattern or screen 2 as shown in FIG. 6. As a specific example, one print structure might be made using a 600 dot per inch (dpi) diffusion dither of a tone, while the other structure is made using a 150 line screen of the tone. One can find pixel 8 bit pixel values for each of these print structures at an embedding location (e.g., of size 50 embedding location per inch) that, when scanned, have the same gray value. However, due to the difference in dot gain, the print structures have different gray values after subsequent print generations that occur during copying. These two different print structures can be mapped to the embedding locations based on the binary value at the embedding location, such as shown in FIG. 3. This process creates a signal where there is no luminance difference before the dot gain effect due to copying, but an increase in luminance difference after the dot gain. This shift in luminance that occurs between the two types of print structures causes the embedded signal to become detectable in copies, yet remain undetectable in originals.

More examples include a structure that has aliasing property 1, and a structure that has aliasing property 2. As in the case of different colors or dot gains, the difference in the aliasing property due to copying can alter the embedding location's appearance and either make the embedded signal more or less detectable.

As explained in further detail below, these structures can be selected so that they have measurable values, such as luminance, intensity, or some other characteristic, that diverge or converge in response to a copy operation. Combinations of these structural features may be combined to make the divergence or convergence more dramatic. In addition, combinations of these features may be used to represent multiple auxiliary signal states at the embedding location.

The example shown in FIG. 4 is sometimes referred to as line continuity modulation because the auxiliary signal is carried in an image of lines by varying the continuity of the lines. For example, the auxiliary signal is embedded in the line image by selectively breaking the lines where the corresponding embedding location value is zero.

After selecting the desired print structures for each embedding location, the result is an image that is ready for printing. The print structures may be designed and specified in a format that is compatible with the type of printer used to print the image on a substrate such as paper, plastic, etc. Many printers require that image or other data be formatted into an image compatible for printing on the particular printer in a process called RIP or Raster Image Processing. This RIP transforms the input image into an image comprised of an array of the print structures compatible with the printer hardware. These print structures may include line screens, halftone dots (clustered dots), dither matrices, halftone images created by error diffusion, etc. Our implementation may be integrated with the RIP to create an image formatted for printing that has the desired print structure per embedding location. Alternatively, it may be designed to be ready for printing such that the RIP process is unnecessary or by-passed.

As an alternative to selecting print structures in block 106, the auxiliary signal generator may produce an array of values that specify a change to the print structure of a host image into which the auxiliary signal is to be embedded. For example, the array of values in FIG. 3 may specify that the luminance of the print structure at the corresponding embedding location is to be increased or decreased. Rather than specifying the print structure to be printed, the auxiliary signal from block 104 may specify changes to print structures of a pre-existing image so as to embed the auxiliary data in this pre-existing image. This method has the flexibility of either designing an image carrying the auxiliary data by selecting the desired print structures, or embedding the auxiliary data in a pre-existing image by making desired changes, as necessary, to the print structures. For example, the auxiliary signal could indicate to print at the same ink dot, line or shape density, but change its color at the embedding location. As another example, the auxiliary signal could indicate to print at the same color, but change its density. As another example, the auxiliary signal could indicate to print at the same color and overall ink coverage per the embedding location, but use different numbers or sizes of ink shapes within the embedding location.

In block 108, a printer prints the resulting image on a substrate. This produces a printed document (110). The term "document" generally encompasses a variety of printed objects, including security documents, identify documents, banknotes, checks, packages, etc. or any other type of printed article where copy detection is relevant.

The bottom of FIG. 1 generally illustrates the types of activities that the auxiliary signal is designed to detect. An authentic document is expected not to have any intervening copy operations, and instead be input to an authentication scan process 112 directly. This authentication scan process may occur at any point to authenticate the printed document, such as when it is presented for access, payment, or when it is spot checked. Copies, in contrast, will undergo an intervening copy operation, which is generally illustrated as a scan 114 and print 116 cycle before the authentication scan 112. This scan print cycle 114-116 may be performed on a copy machine with integrated scanning and printing or in separate scan and print operations.

Figure 2:
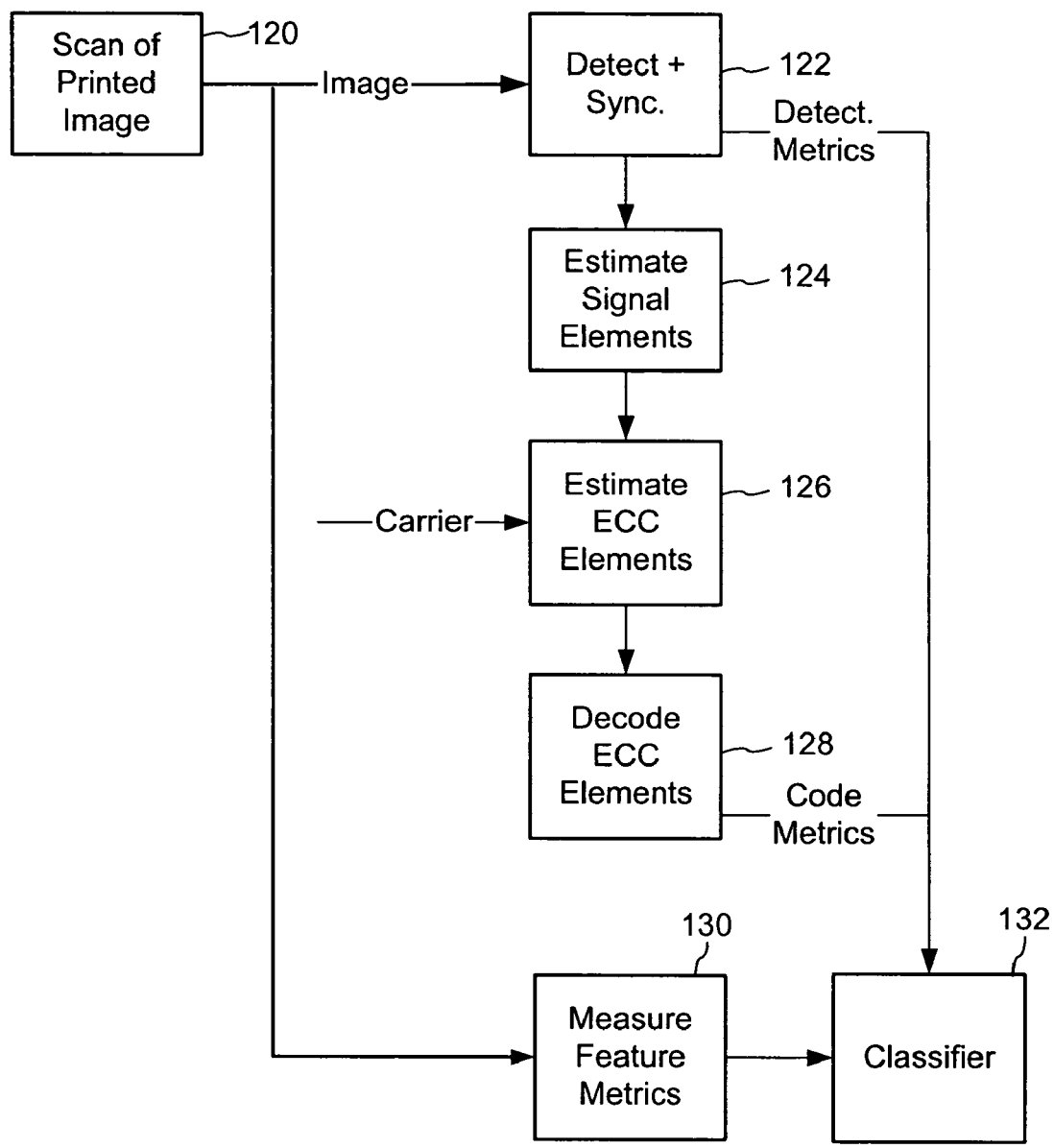
FIG. 2 illustrates a process for authenticating a printed object using metrics derived from an embedded auxiliary signal and print feature metrics.

The copy operation is expected to make certain aspects of the printed image change, and copy detection process of FIG. 2 is designed to detect these changes. This process has two primary ways of detecting these changes: 1. Measuring changes to the auxiliary signal generated and printed in the image as described above; and 2. Making changes to other features on the printed image that are measurable from an image scan of that printed image. As we will illustrate, examples of these features include print structures that have detectable changes due to copying, like structures that alias in a particular way, shift in color, or dot gain. These features can overlap with the auxiliary signal because the auxiliary signal can be constructed from these print structures at the embedding locations as explained above.

The authentication process starts with the authentication scan of the printed image (120). The quality of this scan varies with the implementation. In some cases, it is an 8 bit per pixel grayscale value at particular resolution such as 100 to 300 dpi. In other cases, it is a binary image. The parameters of the auxiliary signal and other copy detect features are designed accordingly.

The process of extracting the auxiliary signal is illustrated in blocks 122 to 128. An auxiliary signal reader begins by detecting the synchronization signal of the auxiliary signal. For example, it detects transform domain peaks of the synchronization signal, and correlates them with a known synchronization pattern to calculate rotation, scale and translation (origin of the auxiliary signal). Examples of this process are described in application Ser. No. 09/503,881. and U.S. Pat. Nos. 6,122,403 and 6,614,914.

As shown in FIG. 2, the detection of the auxiliary signal, or more specifically, the synchronization signal component, can be used as one of the metrics for copy detection. One such metric is the maximum correlation value in the correlation space computed by correlating the synchronization pattern and the known pattern, and another metric is the relative values of the highest correlation peak and one or more lower correlation peaks in this correlation space.

The next step in extracting the message from the auxiliary data is estimating the signal elements (124). The reader looks at the synchronized array of image values and estimates the value of the auxiliary signal at each embedding location. For example, in the case where the auxiliary signal is embedded by adjusting the luminance up or down relative to neighboring locations, the reader predicts the value of the auxiliary signal element by comparing the luminance of the embedding location of interest with its neighbors.

Next, the reader performs the inverse of the transform with the carrier to get estimates of the error correction encoded elements (126). In the case of a spreading carrier, the reader accumulates the contributions of the auxiliary signal estimates from the N embedding locations to form the estimate of the error correction encoded element. The reader then performs error correction decoding on the resulting signal to extract the embedded message (128). This message can then be used to provide further copy detect metrics, referred to as code metrics in FIG. 2. One such example is to compare the input to the error correction decoder of block 128 with a perfectly reconstructed error correction encoded message. This can be achieved by verifying that the message has no errors using the error detection part of the message, and then re-applying block 100 to the verified message. This is just one example of a method for measuring the bit errors in the extracted auxiliary signal as a copy detection metric. More examples and details are provided in 60/351,502, and Ser. No. 09/938,870 and published applications US2003/0177359 and US2002/0099943A1, which are hereby incorporated by reference.

In addition to the metrics based on the embedded auxiliary signal, the reader also computes metrics based on other features on the printed object (130). Some examples include analysis of aliasing of certain structures, frequency domain analysis of certain structures that change in a predictable way in response to a copy operation, analysis of fonts on the printed object to detect changes in the fonts due to copying or swapping operations, etc. All these metrics are input to a classifier 132 that determines whether the metrics, when taken as a whole, map to a region corresponding to a copy or to a region corresponding to an original.

One form of classifier is a Bayesian classifier that is formulated based on a training set of copies and originals. This training set includes a diversity of known originals and copies that enables the regions to be defined based on a clustering of the metrics for the originals (the region in metric space representing originals) and the metrics for the copies (the region in metric space representing copies). The training process computes the metrics for each copy and original and maps them into the multi-dimensional metric space. It then forms regions for copies and originals around the clustering of the metrics for copies and originals, respectively.

In operation, the classifier maps the metrics measured from a document whose status is unknown. Based on the region into which these metrics map, the classifier classifies the document as a copy or an original. More regions can be created in the metric space if further document differentiation is desired.

Having described the entire system, we now describe a number of specific types of print structures that can be used to embed the auxiliary signal, or that can be used independently to create copy detect features.

FIG. 3, as described earlier, provides a binary representation of an auxiliary signal mapped to embedding locations on a document. One way to create this signal is to use a digital watermark generation process.

One such process is to embed a digital watermark into a block of midlevel gray values, threshold the result to binary values per embedding location, and then insert the desired print structure and property (e.g., line structure, screen, color, etc.) per embedding location based on the auxiliary signal value at that location.

In the case of a line continuity method of FIG. 4, the binary values map to the presence or absence of a line structure. An alternative is a line structure at color 1 or the same line structure at color 2, using the two colors shown in FIG. 5 to represent the binary states of the auxiliary signal. Another alternative is a screen 1 or screen 2 (at the same or different colors), using the two screens in FIG. 6 to represent the binary states of the auxiliary signal. Another related example is to use different rasterization styles in different print structures. For example, one might by a clustered dot while the other is diffusion. Since counterfeiters typically use devices employing a particular type of RIP, like diffusion dither, the difference between these two print structures will change in response to copying. Combinations of the different print structures and properties can be used to represent two or more embedding states per embedding location.

As noted, the differences in the way these print structures respond to copy operations make the embedded digital watermark more readable or less readable We use the term "nascent watermark" for a digital watermark that becomes more detectable after a copy operation. We use the term "fragile watermark" watermark for a watermark that becomes less detectable after a copy operation. While the varying responses of the print structures are useful tool for constructing an embedded machine-readable signal, such as a nascent or fragile watermark, they can also be used as measurable feature metrics apart from the embedded signal. For example, they can be used as separate print features that are measured in block 130 of FIG. 2 and input to the classifier.

In the next sections, we will discuss a number of print structures generally. They may be used as embedded signal elements and independent print features.

Colors

As noted above with reference to FIG. 5, the way in which some colors respond differently to copy operations may be used as a copy detection feature in print structures. This effect can be exploited by measuring the change in the differences between a pair of colors in response to a copying operation, such as an extra scan or print operation. In some cases, this difference goes from zero to some measurable non-zero amount (e.g., makes a nascent embedded signal carried in the difference value appear). In other cases, this difference goes from some non-zero amount to zero (e.g., makes a fragile embedded signal carried in the difference value disappear).

One way to use colors for copy detection is to select out of gamut inks for use in one or more of the print structures. A color gamut defines a range of colors. Different color schemes (e.g., RGB and CMY) generally include a unique color gamut. Such color schemes will most certainly have overlapping color gamuts (or ranges), and unique (or out of gamut) color ranges.

Inks or dyes can be selected that lie outside of a color gamut of a capture device (e.g., an RGB scanner) used in typically copying operations, yet fall within the gamut of the authentication scanner (e.g., panchromatic scanner). Consider a document that is printed with some dark blues and violets in the CMYK space, which are out of gamut for the RGB space. When a scanner scans the CMYK document, it typically scans the image in the RGB space. The RGB scanning loses the dark blues and violets in the conversion.

This approach extends to color gamuts of printers used in counterfeiting as well. Inks can be selected that fall outside the typical gamut of CMYK printers likely used by counterfeiters.

Another approach is to use a metameric ink for one or more of the print structures. These inks look different to different types of scanners and/or lighting conditions, and therefore, lead to detectable differences in the scanner output. The differences between the authentication scanner output and the counterfeiter scanner output provide detectable differences between copies and originals. Thus, these inks are candidates for use in the print structures.

Another approach is to mix different amounts of black in one of a pair of colors. An authentication scanner that has better sensitivity to these differences will represent the differences in colors more accurately than a typical RGB scanner. The change in the luminance difference between these two colors in response to a copying operation provides another copy detection feature for the print structures.

Another approach is to use a pair of colors where one color is persistent in black and white image scans, while the other is not. Again, the change in the differences between these colors in response to a copying operation provides another copy detection feature for print structures.

Dot Gain

Above with reference to FIG. 6, we illustrated how the change in dot gain between a pair of print structures can be used as a copy detection feature. This effect can be measured in grayscale and binary image scans of a printed image.

The prior example described how the difference in dot gain of two print structures due to copying corresponds to measurable differences in luminance of the two structures. This difference in luminance can make be used to make a nascent or fragile embedded signal carried in the luminance difference value. It can also be used on other print structures as well.

In grayscale images, this shift in luminance causes a shift in the gray level values. In binary images, the gray levels are thresholded to black and white. As such, some binary pixels that were once thresholded to white, now are thresholded to black. This shift can be measured using a strip of a gradient with varying grayscale values. The point at which this gradient is thresholded to black shifts due to the dot gain.

A number of different structures can be constructed to detect the shift in luminance. These include:

A gradient area and a tonal area (constant tone)

A gradient pair, including a gradient more susceptible to dot gain and a gradient less susceptible to dot gain.

Several pairs of gradients are printed such that when converted to black and white, the shift in luminance due to the dot gain creates a pattern of shifts that is detectable in the frequency domain (e.g., a periodic function that makes a detectable peak in the frequency domain).

Gradients susceptible to the luminance shift due to dot gain can be combined with inks that are also sensitive to copy operations to produce an additive shift effect that is more detectable than using only dot gain or color effects alone.

A first example technique exploits the differences in dot gain in original vs. copied documents. The original document is printed with areas at a first screen, and a second screen. Due to the fact that dot gain has a greater effect on dots at one screen than the other, the differences in dot gain of these areas distinguish between originals and copies. These differences in dot gain can be used to carry a hidden signal that becomes machine readable in copies.

A variation on this technique includes using an area of a solid tone, and an area of a gradient tone. Again, if these areas are printed using different screens with different sensitivities to dot gain, the dot gain caused in the copy operation impacts these areas differently.

The areas of the first and second screens can be randomly distributed throughout the document according to a secret key that specifies the spatial mapping of the screen types to document locations.

Aliasing Effects

The aliasing of certain print structures provides a copy detection feature for print structures. Typical printers used in counterfeiting cannot accurately reproduce certain types of printed structures because these structures are difficult to screen or dither. One such structure is a curved line, or sets of curved lines (e.g., concentric circles). FIGS. 7 and 10 provide some examples of sets of curved line structures.

These curved structures are difficult to screen or dither at different angles. As a result, the lines are smeared in a counterfeit document. This effect is observable in the frequency domain. Preferably, these line structures are tightly spaced (e.g., have much high frequency content).

In some cases, one must implement the copy detect reader for images that are scanned at a relatively low resolution. Given this constraint, the high frequency content is likely to alias in both the original and copy. However, the copy will not have as much energy as the original in areas of the frequency domain where the aliasing occurs. This can be detected using the technique illustrated in FIGS. 7-12.

As noted, FIGS. 7 and 10 represent examples of line structures. FIGS. 8 and 10 show the corresponding frequency domain representations. Finally, FIGS. 9 and 12A-C show a mask (the white areas) for use in measuring the energy where the aliasing is expected to occur. The amount of energy in this aliasing area forms a metric that can be used along with other metrics to distinguish copies from originals.

These line structures can be combined with embedded signaling methods (such as nascent or fragile watermarks) by using line continuity modulation to embed an auxiliary signal in the line structure. The embedding locations can be represented as the presence vs. absence of a line, or a line of one color vs. a line of a different color per above to represent the states of the embedded signal.

Another use of the embedded signal is to use the geometric synchronization that it provides to locate and align the print structure used to measure aliasing effects.

In the case where the embedded signal is carried in line structures, frequency metrics can be used to measuring energy peaks and/or aliasing effects that occur on the line structure and differentiate copies and originals. The horizontal line structures of FIG. 4, for example, cause aliasing in the vertical direction that can be measured in the frequency domain. These line structures form peaks in the frequency domain. A radial frequency metric can be used to classify these peaks in originals and copies (e.g., by comparing normalized ratios of average radial energies), and differentiate originals and copies based on the separation in the metrics.

Frequency Domain Features

In addition to measuring aliasing effects in the frequency domain, other structures such as line structures or shapes can be measured in the frequency domain. Further, these structures can be combined with the color or dot gain effects to derive copy detection metrics.

One example combines line structures with pairs of colors. One line structure has a first color and translates into detectable frequency domain feature such as peak or set of peaks. A second line structure has a second color and translates into a different frequency domain feature such as different peak or set of peaks. The shift in the color differences can be measured in the frequency domain by measuring the relationship between these peaks.

Another example is to use a feature like the synchronization signal of the embedded signal that forms a set of peaks at known locations in the frequency magnitude domain. Two or more these signals can be embedded at using two or more different colors. The peaks of each are then detected and compared relative to each other to detect the shift in color that occurs during a copy operation.

Compression Effects

If the scanned image for authentication is expected to be compressed, certain print features can be designed that have varying susceptibility to compression, such as JPEG compression. Differences in the way copies and originals respond to compression can then be detected and used as another metric.

Additional Embedded Signal Metrics

As an additional enhancement, the print structures that form one of the states of the embedded signal (e.g., the 0 state in the embedding locations shown in FIG. 3) can be given a gray level value that varies as a function of location on the document. The shifts that occur due to copying impact the gray levels differently, and as such, change the detection zones of the embedded signal. These changing zones of detection of the embedded signal can be measured and used as yet another metric.

Other Feature Analysis

Additional print features such as fonts can be used to detect copies. Special fonts may be used that are difficult to reproduce. The changes in the fonts can be measured and used as additional print feature metrics.

In addition, fraudulent entries can be detected comparing differences in font types on different parts of the document. For checks and other financial instruments, certain hot spots are more likely to be changed than other static areas. These include areas like the text representing the name, amount, and date on the check. FIG. 13 shows an example where the fonts on two different areas are compared to ensure that they match. If not, the fonts have likely been altered through check fraud.

System Design

In this section, we describe a system design that uses digital watermarking and other security features to analyze the authenticity of printed objects based on images scanned of a suspect printed object. In this system, an image printed on the document carries a robust digital watermark, one or more other watermarks (e.g., fragile watermarks and variable-high payload watermarks) and other security features. In some applications, these features are printed on the document at different times, such as when blank versions of the document are printed, and later when variable data is printed onto the blank document. To authenticate the document, a reader analyzes a digitized image captured from a suspect document, measures certain authentication metrics, and classifies the document as an original or counterfeit (or type of counterfeit) based on the metrics. This system, in addition, uses an auxiliary data carrier, namely the robust watermark, to convey auxiliary information that assists in classifying the document.

The robust watermark is designed to survive generations of printing and scanning, including lower resolution scans and conversion to a binary black-white image. It carries auxiliary data to set up the classifier. Examples of this classifier data include:

1. an identification of the document type (which may implicitly convey the corresponding security features, their corresponding metrics, and thresholds for the metrics (e.g., an index to a document design table);

2. an identification of security features on the document (including, for example, types of inks, gradients, frequency domain features, artwork, etc.);

3. an identification of the location of the security features on the document (e.g., relative to some reference location, such as a visible marking or structure on the document, or some invisible orientation point provided by the robust watermark);

4. an identifications of the metrics to be used by the classifier;

5. an identification of the thresholds or other parameters of the metrics used by the classifier. These thresholds are used to distinguish between categories of documents, such as the original and different types of fakes (fakes made by photocopier, by laser printer, by ink jet printer, etc.)

6. an identification of the classifier type (e.g., an index to a look up table of classifier types).

7. an identification of the training data set for the classifier.

In this system, the robust watermark provides geometric synchronization of the image. This synchronization compensates for rotation, spatial scaling, and translation. It provides a reference point from which other features can be located.

The robust watermark may be printed on the front, back or both sides of the document. It may form part of the background image over which other data is printed, such as text. It may be hidden within other images, such graphic designs logos or other artwork, printed on the document. It may occupy the entire background, or only portions of the background. In the case of value documents like ID documents, securities, and checks, the robust watermark may provide geometric and other parameter reference information for other watermarks carried in images printed on the document. For example, the robust watermark can provide a geometric reference for a high capacity, variable message carrying watermark that is printed along with the robust watermark or added at a later time.

In some applications, the variable message-carrying watermark carries data about other variable data printed on the document. Since this other data is often printed later over a pre-printed form (e.g., a check with blank payee, amount and date sections), the high capacity, variable message carrying watermark is printed on the document at the time that the variable text information is printed. For example, in the case of checks, the variable information printed on the check such as the amount, payee, and date are added later, and this data or a hash of it is embedded in the high capacity watermark and printed at the same time as the variable information.

The line continuity modulation mark may be used to carry this variable data. To increase its payload capacity, it does not have to include geometric synchronization components. This synchronization information can be carried elsewhere. This mark need only carry the variable message information, possibly error correction coded to improve robustness. The line structure itself can also be used to provide rotation and scale information. The reader deduces the rotation from the direction of the line structures, and the scale from the frequency of the spacing of the line structures. The origin or translation of the data can be found using the robust watermark printed elsewhere on the document, and/or using a start code or known message portion within the watermark payload.

Alternatively, another high capacity mark or digital watermark may be printed in an area left blank on the document surface to carry variable data corresponding to the variable text data printed on the check. For authentication, the two can be compared to check for alteration in the variable data printed on the check vs. that stored in the high capacity mark.

The use of the robust watermark on both sides of the document provides at least two additional counterfeit detection features. First, the presence of the robust watermark on both sides of the document (e.g., check or other value document) verifies its authenticity. Second, the geometric registration between the robust watermarks on the front and back provides another indicator of authenticity. In particular, the geometric reference point as computed through geometric synchronization of the robust watermark on each side has to be within a desired threshold to verify authenticity.

The robust watermark may also provide an additional metric to detect alterations on certain hot spots on the document. For example, consider a check in which the robust watermark is tiled repeatedly in blocks across the entire check. When variable data is printed on the check at certain hot spots, such as payee name, amount and date, this printing will reduce detection of the robust watermark in the hot spots. Fraudulent alteration of these hot spots (e.g., to change the amount) creates a further reduction in the measurement of the watermark in these hot spots. The reader can be designed to measure the robust watermark signal in theses areas as a measure of check alteration.

The robust watermark may also carry additional variable information about the document, such at printer, issuer, document ID, batch ID, etc. For checks or securities, this watermark may also carry an amount indicating the maximum allowable value or amount. The reader at a point of sale location, sorter or other check clearing location deems invalid any value amounts over this maximum amount at the time the document is presented for payment or transfer. Also, the robust watermark may carry a job number, printer, or date. This data may be used to identify checks that are out of place or too old, and thus, invalid or flagged for further analysis.

The robust watermark may be included in design artwork, etc. that is printed with inks having special properties. One example is thermal inks that require the document to be adjusted in temperature to read the robust watermark. Inability to read the watermark at a particular temperature can be an added indicator of validity.

FIG. 14 is a system diagram illustrating how information extracted from the robust watermark can be used to set up and adapt a classifier over time. In this system, a number of document scanners are deployed in the field. These may be located at Point of Sale (POS) locations, in document sorters, or some other location in the chain of handling of the document. Each of these scanners is interconnected via a network to a server and database of master training set data, enabling data captured in each to be logged and used to adapt the classifiers.

In the top of FIG. 14, reader 1 is expanded to show the analysis of a digital image captured from a document. The digital image includes security features (possibly including digital watermarks, etc.) and a robust watermark. A digital watermark reader extracts the robust watermark, including its message payload. This payload, among other information, provides an index into a table that indicates the feature set (F) to be evaluated, the parameters for that feature set (P) such as any pertinent thresholds, and an index to the training set data to be used by the classifier. The training set data is stored in a local training set database. This database is initialized with training set data used to design the classifier. In addition, the training set may be adapted over time as the system encounters more documents. This enables the system to adapt to new types of counterfeits, and also to fine tune discrimination based on actual data during operation. Further, it enables the classifier to adapt to operating characteristics of the scanner or other system components that impact the authentication analysis.

Having selected the appropriate feature set, parameters and training data, the reader performs the feature analysis to measure features at the appropriate locations on the scanned image, and passes these measures to the classifier. The classifier adapts its operation to the types of metrics and training set selected for the document. It then classifies the document as an original or counterfeit (or specific type of copy).

As noted above, this system provides a number of enhanced capabilities. First, the classifier can be updated or changed over time. For example, classification data (including feature measurements and corresponding classification results) can be logged separately for each document type, and the training data can be updated to include this data for classifications that are deemed to be suitably reliable. As the population of reliable training data grows, the classifier becomes more effective and adapts over time. The training data can be based on the most recent results and/or the most reliable results for each document type. For example, the training data can be constantly updated to be based on the last 1000 reliable detections for each document type.

The operating characteristics of the scanner can also be tracked over time, which enables the classifier to be adapted based on changes in the performance of the scanner. This enables the classifier to compensate for scanner decay over time. As new data is generated, the training data can be updated so that it is current for the most current scanner performance and the most recent data on originals and counterfeits.

To reduce false alarm rate, preferably the training data should be updated with reliable classification data. In addition, documents that are mis-classified, yet later detected in the system can have their corresponding data classification removed from the training set, or updated to correct the system.

Certain documents whose metrics do not map clearly into original or counterfeit classifications can be logged in the system and flagged for follow up. This follow up analysis may lead to another document category being created in the classifier, or a refinement in the selection of metrics for each document type that enable more effective differentiation between originals and counterfeits. In addition, documents flagged for follow-up can be routed to further authentication processes, such as a scan with a higher resolution scanner to check security features that are detectable only at high resolution scans.

Overtime, the classification results can be further analyzed and sub-divided into sub-categories indicating the type of counterfeit. For example, counterfeit types can be classified based on the type of printer used to counterfeit the document. Also, the set of features and parameters used to analyze these document types may be adapted over time. For example, it may be learned that a particular metric will provide more effective differentiation, so the reader may be adapted to analyze that metric and use a classifier that is dependent upon that metric.

As indicated in the diagram, training data may be kept specific to the local device and/or shared among all devices (e.g., such as a group of point of scale scanners, or a group of sorter scanners). Grouping the data from all scanners creates a larger population from which to adapt and refine the classifiers for each document type. This is particularly true for different types of checks from different issuers and printers.

More on Classifiers for Counterfeit Detection

The counterfeit detection problem comes down to making a reliable, automated decision about the authenticity of a particular document. It may be possible to make such a judgment from the detected performance of a single metric. Typically such a metric will be associated with changes to a single physical parameter introduced by the counterfeiting process, and thus may be vulnerable to counterfeits produced by other techniques. Alternatively it is frequently seen that the results from a single detection metric do not give results that individually meet the performance requirements of the system, whereas the results from the combination of two or more metrics will result in a completely satisfactory system. An example of such a situation is shown in FIG. 15.

In FIG. 15, we have plotted two detection metrics against one another for samples from two classes indicated by green and blue data points. As may be seen in the small figures along each axis of the main figure the results produced by either metric are not particularly useful in separating the original and counterfeit distributions, both metrics will give a large number of missed detects and false alarms. However it can be seen by partitioning the space along line A, or by rotating the space and using a single threshold the two classes may be easily separated.

We refer to the use of automated methods to divide a multidimensional population into two or more classes as classifier technology. When the classifier is used to separate a population into only two classes, the results may be used as a detector for those classes. The task of the classifier is to learn the behavior of metrics from available data samples from each class (originals and counterfeits) and then use this knowledge to classify an unknown new document as original or counterfeit. Below, we describe different types of classifiers. A probabilistic or Bayesian classifier has been implemented, as has a non parametric classifer called the k Nearest Neighbor (kNN).

Bayesian Classifier

This classifier is based on a simple Bayesian method. It calculates a statistical "distance" from a test object to the center of a probability cluster, in order to approximate the likelihood that the object belongs to that cluster. To classify a test object, the classifier finds which cluster the object is closest to, and assigns the object to that class. In the current design, three classes (original, xerographic, and ink jet print) are being used. If an object is classed as xerographic or print, then it is reported as "copy" to the user.

In order to realize the method above, we need a way to calculate a statistical distance between a class cluster and the test object. This method uses a simplified distance, based on the mean and standard deviation for each class. When using N metrics, each class is represented by a vector of means (M1, M2, M3, ... MN) and a vector of standard deviations (S1, S2, S3 ..., SN). The distance is calculated as:

$$D = \sqrt{\sum_i \frac{(m_i - M_i)^2}{S_i^2}}$$

More complicated classification techniques exist, but this method has proven useful for the check authentication classification problem. The calculation is not a real distance, but approximates the relative likelihood of being in a class, if the underlying probability distribution of each cluster has a single peak and is symmetric.

Since the distance to each class must be computed to classify a test object, the classifier must know the mean and standard deviation of each. The classifier has been loaded with these values and validated through a process of training and testing. In training, a portion of the available data is used to determine the values loaded into the classifier. Then the rest of the data is used to test the classifier's ability to distinguish an original from a counterfeit.

kNN Classification

The k Nearest Neighbor (kNN) classifier is a non-parametric classifier that does not rely on any assumption about the distribution of the underlying data. The kNN classifier relies on instance-based learning. For a new data sample to be classified, the k nearest samples to this sample from the training set are identified. The nearest samples are identified using a distance measure, such as Euclidean distance or weighted Euclidean distance. The new sample is then assigned to the class that has the most instances in the k nearest samples. An appropriate value for k can be chosen by a method of cross-validation (running the classifier on random subsets of the traning set). In our experiments, we have used k=5 with a Euclidean distance measure on a normalized set of metrics (metrics normalized to obtain similar dynamic range for each metric).

The advantage of a kNN classifier is its non-linear, non-parametric nature and tolerance to arbitrary data distributions. A kNN classifier can perform well in the presence of multi-modal distributions. Since it uses local information (nearest samples), it can result in an adaptive classifier. In addition, implementation is simple.

The disadvantage of kNN is that it is suboptimal to a Bayes classifier if the data distributions are well defined and Gaussian. It can be susceptible to a large amount of irrelevant and noisy features and therefore benefits from a feature selection process. Although its implementation is simple, it can be computationally expensive if the number of features and training set are very large. However, it lends itself to parallel implementations.

Feature Search Algorithm

By combining features, classifiers can provide performance superior to that of classifiers using a single feature. This is especially true if the features are statistically independent, or nearly so. Ideally, the more features that are included in a classifier, the better will be the performance. Practically, this is not true, due to a phenomenon known as over-training. Since classifiers are trained on a finite set of data and used on a different (and usually much larger) set of test data, mismatches in the statistical distributions of features between these two sets can result in poor classifier performance. The likelihood of mismatch in these distributions is higher for small training sets than it is for large training sets, and classifiers using many features are more sensitive to this mismatch than are classifiers with few features. The end result is that larger training sets are required for reliable design of classifiers with many features. When a small training set is used to train a classifier with many features, the result may be over-training; the classifier performs very well for statistics modeled by the training data, but the statistics of the training set do not match those of the test set.

To find the best performing set of features for a classifier, given a training and test set, requires exhaustively searching among each possible combination of features. In many cases, there are many features to choose from, so this exhaustive search task becomes computationally complex. To reduce complexity, we have used a sub-optimal hierarchical search to lower the search complexity. The features have been grouped into three groups. Group 1 includes those closely related watermark metrics, group 2 includes those features indicative of frequency content of watermarked areas, and group 3 includes those features that are derived from other (non-watermarked) security features. The sub-optimal search begins by finding the best performing classifier using only features from group 1, and the best performing classifier using only features from group 2. The second step of the search algorithm finds the best classifier from among possible combinations. This step requires a search of a subset of the possible classifier designs. The goal in construction of this two-step algorithm was to use the first step to optimize among sets of the most closely related features to minimize interaction effects at the second step. In each search process, if there were multiple classifiers with equal performance, the classifier with the smallest number of features was chosen, to minimize over-training effects. The searches minimized a weighted sum of the probability of missed detection and the probability of false alarm. This weighting gave twice the weight to a false alarm as to a missed detection.

Dual Contrast Watermarks

An objective of dual contrast digital watermarks is to identify counterfeits in which the contrast of the watermark has been modified with respect to the originals. The technique includes using two separate digital watermarks each occupying a specific contrast range. For example, one watermark could have a low contrast appearance, with the other watermark having a high contrast appearance.

As discussed below, the relative strengths of the two watermarks provide the distinction between originals and counterfeits. This makes the task of counterfeiting difficult as the counterfeiter must either reproduce the contrast of both watermarks accurately or modify them in such a way that their relative strengths remain unchanged. Accurate reproduction of contrast of both watermarks is difficult with casual counterfeiting tools (desktop scanners and printers, color copiers, black and white copiers) as they generally tend to enhance one of the watermarks increasing its contrast. Often this results in the other watermark being suppressed. Maintaining the relative strengths of the watermarks is difficult without access to the detector.

The watermarks are designed in such a manner that their interference with each other is reduced. To ensure reduced interference, aspects such as spatial frequency, structures and colors (e.g., as explained above) are exploited in addition to contrast.

Contrast

The two watermarks are intended to have a large separation in their contrast ranges. One watermark occupies the low contrast range and the other occupies the high contrast range. One possible choice for the low contrast range would be the lowest contrast range (given the watermark strength) that can be successfully printed by the security printer and detected by the detection scanners. Similarly, the high contrast range can be determined for a choice of printers and detection scanners.

Contrast enhancement during counterfeiting could result in one of the following cases- 1) The contrast is stretched such that the contrast of the high contrast watermark is increased and that of the low contrast watermark is decreased.

2) The contrast of the high contrast mark is enhanced, while the low contrast mark is unchanged.

3) The contrast of the low contrast mark is enhanced, effectively bringing its contrast range closer to that of the high contrast mark.

In each case above, one of the two watermarks is enhanced—at the detector this usually implies higher detected watermark strength. The above assumes that the grayscale modification curve (or gamma correction) is either not linear or does not preserve dynamic range.

Spatial Frequency

When there are multiple watermarks in an image or document they interfere with each other reducing the detectability of each watermark. For example if the two watermarks had the same synchronization signal comprising an array of peaks in a frequency domain, but different payloads, the synchronization signal strength would be reinforced whereas the two payloads would interfere with each other and be affected by synchronization signal noise. If each watermark had its own synchronization signal and payload then each would interfere with the other.

To reduce cross-watermark interference it is desirable to have the watermarks separated in spatial frequency. One way to achieve frequency separation is to embed the two watermarks at different resolutions. This method allows both watermarks to be of the same type without causing severe interference.

For copy detection testing, the low contrast watermark was embedded at 50 wpi whereas the high contrast watermark was embedded at 100 wpi. Other resolutions may be more appropriate depending upon the image resolution and the resolution of the detection scanners. An additional advantage of embedding at different resolutions is that the peaks in the synchronization signal of the combined watermarks cover a larger frequency range. This can lead to more effective discrimination metrics between originals and counterfeits.

Structures

Design structures provide a means to achieve separation between the watermark features as well as accentuate the differences in contrast ranges. Structures can be favorably exploited to yield increased discrimination between originals and counterfeits For our copy detection testing, the low contrast watermark is contained in a soft-sparse structure that appears like a background tint pattern. The high contrast watermark is contained in a LCM (line continuity modulation) structure giving it an appearance of distinct line patterns. An example is illustrated in FIG. 16. These two structures are intended to meet two main objectives. The first objective is that the LCM lines should appear the dominant pattern in the image. A counterfeiter is then more likely to reproduce the LCM lines more accurately than the background tint. The second objective is that the low contrast background tint watermark should have larger structural elements than the LCM lines. This would cause the background tint to overpower the smaller LCM line structures if the contrast of the background is enhanced.

Colors/Inks

Color can be used as an important attribute to further improve the effectiveness of dual contrast watermarks. For example, inks having out-of-gamut colors could be used for the design structures. Reproducing such colors with CMYK equivalents would affect the contrast of the watermarks thus improving discrimination. More information is provided in Application 60/466,926, which is incorporated above.

A major advantage of the dual contrast technique is that both watermarks could be printed with the same ink. This avoids mis-registration issues. In this case, simply using an out-of-gamut ink would suffice.

In printing environments having high registration accuracy, the dual contrast technique could also be used with multiple inks to help render the counterfeiting process more difficult. In this case, each of the two watermarks would be printed with different inks. The inks could be selected such that their CMYK equivalents have a different contrast range relationship than the original inks.

Metrics from Dual Contrast Watermarks

FIG. 17 is a diagram illustrating an example process for evaluating metrics from dual contrast watermarks for copy detection. This technique can utilize metrics described previously in this document. For the initial experiments, examples of correlation metrics used include Correlation Strength, Weighted Correlation, Detection Value and message-level SNR.

The detector is run twice on the image—once with the WPI set to 100 to detect the high contrast, higher resolution watermark and then with the WPI set to 50 to detect the low contrast, lower resolution watermark. Each run produces a set of metrics from the core for the targeted watermark. Note that since the core is capable of detecting either (or both) of the watermarks during each run, the system can be designed to only read the targeted watermark. This could be achieved simply by observing the scale parameter of the detected synchronization signal(s) and restricting each run to use the synchronization signal that has scale 1.

The output from the detector core is a set of 2N metrics, N from each of the two runs to extract the two watermarks. These 2N metrics could directly be used as input features in a classifier configuration. In this case the classifier would learn the relationships between the same metric obtained through the two runs and also the relationship across metrics. Another approach is to obtain a new set of relative metrics. Our knowledge of these metrics can be used to devise relative metrics that highlight the differences between originals and counterfeits. This can simplify the design and task of the classifier.

Experimental Setup

The design for the dual contrast watermark consisted of one LCM watermark (high contrast) at 100 wpi and one soft-sparse watermark (low-contrast) at 50 wpi. The design was printed using Pantone 1595, which is an out-of-gamut orange.

Some example metrics are calculated as,

Correlation Strength Normalized Differential (CSND)=$abs(CS_H-CS_L)/CS_H*10$

The metric is based on the number of peaks detected in the synchronization signal per the total number of peaks in the synchronization signal.

Weighted Correlation Normalized Differential (WCND)=$abs(WC_H-WC_L)/WC_H*5$

This metric is similar to CS, except that it is weighted by frequency and focuses on peaks of the synchronization signal in the mid-frequency range.

Detection Value Ratio (DVR)=$DV_H/DV_L$

This metric is based on a relative metric of the highest correlation value for the synchronization signal relative to the next highest candidate.

PRAM Ratio (PRAMR)=$PRAM_H/PRAM_L$

This PRAM metric is a comparison of the raw watermark message payload before error correction relative to the actual watermark message.

Signature Level SNR Differential (SNRD)=$abs(SNR_H-SNR_L)$

This is similar to the PRAM metric in that it is based on watermark message values, but the measure is converted to a Signal to Noise metric using the standard deviation of the watermark message signal.

In the above, abs(.) denotes the absolute value operation and the subscripts H and L stand for the high contrast and low contrast watermark, respectively.

Applications of Digital Watermarking in the Image Replacement Workflow

Introduction

With the adoption of Check Truncation Act, the banking industry will be allowed to destroy physical checks at time of processing and transmit digital images of the check in their place. The images of the checks will be used for all subsequent processing, except when a physical form of the check is needed by a financial institution or customer that does not wish to or cannot use an electronic version.

The physical form of the check when created from the captured image is referred to as an Image Replacement Document (IRD). IRDs are afforded the same legal protection and status of the original check, as such it is subject to the same forms of fraud as the original check and is likely to become a vehicle for new forms of fraud that attack the IRD. management/generation system itself.

Workflow

FIG. 18 illustrates different functional steps in the processing of original checks and the creation of the images and finally the IRDs. It is worth noting that during the processing of an item, multiple IRDs may be generated between various institutions and that ERDs may be produced from imaging a prior IRD.

Applications of Digital Watermarking to the IRD

Digital watermarking can be used to thwart three main categories of attack to the IRD:

1. Re-Origination

While less likely than with than re-origination of an original check, this is still a possibility and is made easier given that IRDs are produced on generic paper with standard office printing hardware.

A digital watermark can be placed on the IRD, which would not be present on the re-origination.

2. Copying

This form of attack is likely for the IRD. Given how it is produced, the counterfeiter has to make no special effort to reproduce security features (produced with office equipment on generic paper).

A fragile watermark could be used to determine if the IRD had been duplicated. If the IRD is printed, the copy detection metrics and related watermark structures disclosed above may be used for this purpose. If the check remains in the digital domain, fragile watermark techniques that detect even the slightest alteration, such as those disclosed in Ser. No. 10/319,404 may be used to detect and localize tampering of the IRD. Ser. No. 10/319,404 is hereby incorporated by reference.

3. Data Alteration

Similar to original check, the data on the IRD could be altered. Techniques are currently proposed to protect against this attack that use a visible bar code or data carrying seal structure. These techniques are localized to the bar code or seal structure and not covert.

A watermark could contain all the pertinent data related to the IRD.

The watermark could work in unison with another non-covert feature to validate the data or even validate other security features themselves to ensure they had not been tampered with. For example, one could carry data that is dependent on the other, such as the payload being the same or mathematically related by a secure function and key protocol, digital signature, secure hash, etc.

Watermarks can play role against the three major forms of attack expected against the IRD, but they can also play a role in the system itself. Each time a check, Original IRD, or Subsequent IRD is imaged it is stored in some form in an Image Database. These databases are enormous and will be distributed throughout the financial transaction system (constituent banks and even customers that image at POS).

The volume and heterogeneous nature of the system make it difficult to reliably attach any meta-data to the images. The integrity of the images and related meta-data also needs to be assured.

These challenges/needs are similar to those of professional stock houses that collect and distribute imagery over the Internet. As such all the applications of digital watermarking to digital rights management apply to the IRD workflow as well. For example, U.S. Pat. No. 6,122,403 describes methods for persistently linking images to metadata about the owner of the image as well as other rights. This metadata can include information to authenticate the IRD, such as a secure hash, etc., or a set of rules that govern how the IRD is to be used, processed or transferred.

Finally, the ability to generate Subsequent IRDs based on images generated from prior IRDs places a new requirement on potential watermarking solutions. That being the ability to survive the reproduction process associated with the Subsequent IRD generation process and potentially distinguish between the IRD reproduction processes used by financial institutions and those used by counterfeiters. Robust watermarks designed for survival through these reproduction processes can be used to persistently link to metadata that tracks the processing history of the IRD, including who/what has processed the IRD, at what time and place, and the type of processing that has occurred. In addition, copy detection features, including digital watermarks as described above, may be used to detect different types of reproduction operations.

Digital Anti-Counterfeiting On-Board Mediator (DACOM) Architecture

In this section, we describe how digital watermarks can be used as an on-board mediator for use in authenticating printed documents. Our examples particularly illustrate the DACOM application of digital watermarks in checks, but this application also applies to other secure documents, including value documents like bank notes, securities, stamps, credit and debit cards, etc. and identification documents, like travel documents, driver's licenses, membership cards, corporate badges, etc.

We start with some definitions.

Definitions

Alteration—Use of genuine stock with forged information, whether originally input into the document or changed from the original through erasure, chemical washing, etc.
Copying—The duplication of the document through scanning on a flatbed or drum scanner; using a xerographic copier, or some other reproduction device.
Reorigination—The creation of a new document from scratch. Reorigination may try to recreate an original design or, in the case of checks, may be a wholly new design. For example, a forger may create a corporate paycheck that is not of the original corporate check design, but is a credible design that can be passed as an authentic check.
Point of sale (POS)—electronic verification takes place via a MICR reader, a check scanner (which may be an imager only without MICR read capability) or by key coding in account information (via keyboard or keypad).
Bank of first deposit (BFD)—The BFD may verify a check much in the way done at POS or they may use mid to large capacity scanner/sorters to perform the task.
Check clearing house—Large capacity scanner/sorters will be used to verify checks at the clearing house.
Law enforcement forensic verification—special purpose digital tools may be used to examine and verify documents in a law enforcement scenario.
First-Tier Security Feature—Security feature can be inspected by the lay-user of the document with minimal to no education (tactile feel of Intaglio printing as an example)
Second-Tier Security Feature—Feature that requires limited training to be used and analyzed. An expert in the field may use this feature. If the feature requires a device to ascertain its presence and state, the device is inexpensive and simple to use, something that a bank teller might be equipped with.

Introduction

Effective security architectures traditionally rely on multiple levels of security using redundant features at each layer of the system. A system to thwart check fraud will require the same-tiered approach with the added complexity that checks flow through a heterogeneous network of devices and usage scenarios, all of which play a role in eliminating fraud.

For each usage scenario and type of attack, there can be an individual verification process. For example, the tools to perform verification of re-origination at POS (using POS imagers) will be different, although perhaps related, to those used in the high speed sorting environment, the difference a function of imager availability, resolution, color depth, required decision time and acceptable levels of bad decisions. Thus, with three basic forms of attack and four basic usage scenarios, each having a unique verification process, there are 12 scenarios in which a different security feature, or variation thereof, may be employed.

This is all to say that a truly robust system of check verification would be able to look for many features rather than a single feature, some of which may or may not be digital watermarks. For example, a digital scan checking for re-origination might look at characteristics of a known good check (background color, logo placement, etc) whereas the scan for copying might search for a change in print metrics.

Digital Anti-Counterfeiting On-board Mediator (DACOM)

Given a document with multiple digital verification features, there are several approaches to tracking and verifying the features from one individual document to the next:
1. Each feature can be added and processed serially, essentially requiring each feature vendor to develop their own verification infrastructure or integrate as a new process into the existing verification infrastructure. While conceptually possible, this appears to be a prohibitively inefficient approach, especially in a world in which dozens of digital features might be employed.
2. A centralized database can be used to track the on-board features and accessed according to the account numbers for the document. In other words, the database might indicate that a check has a blue background, microprint, a copy detection watermark and a data verification watermark. Digital systems processing the check could either scan for the feature or, at POS, alert the clerk that the features should be present.
3. A 2-D barcode or other symbol-based technology can be added to the document that holds the critical database information or the information used to link to the database. This approach has been rejected to date based on the visual impact and the ease of attack.
4. A robust watermark can hold either metadata related to digital anti-fraud features or linking information used to access a central database of fraud features.

The case seems compelling for some type of mediation system that can reveal basic information about the document design and the digital anti-counterfeiting features present. Furthermore, the case can be made that the mediation system should exist on the document rather than remotely. Without speaking to the specific advantages of digital watermarking, the case for an on-board mediator (DACOM—Digital Anti-Counterfeiting On-Board Mediator) are as follows:
1. Serial addition of feature verification is expensive to the infrastructure and slows adoption of features. For example, suppose that there are a total of 12 digital anti-counterfeiting features that are used in documents, but the average number on any one document is three. At any given point in verification, the verifying device must either a) search for each of the 12 features, not knowing which are on the document or b) ignore a number of features that might be on the document.

2. Remote database storage of information requires the management of the database with access and agreement as to structure coming from many different parties. Furthermore the database, which would by definition, be accessible from millions of locations, would represent a huge security risk as the data would be a treasure trove for crime. Finally, the database would force a remote access for every verification, overhead that might be impossible or unacceptable for many organizations.

3. On-board mediation can work in disconnected, remote reader environments.

4. The on-board mediator itself can act as a level of security since documents without the mediator might be considered false.

Digital Watermark as DACOM

The specific case for use of digital watermarking as the mediator are as follows:

1. The digital watermark is redundantly embedded (e.g., across the entire surface of the check or document image), giving it a higher survivability than a highly isolated feature such as a barcode or seal.
2. It can be extremely difficult to alter a digital watermark, unlike MICR and account numbers.
3. The digital watermark has a different, and potentially more acceptable visual impact on the document than barcodes.
4. Although potentially removable or even transferable, this attack requires both system knowledge and a higher level of skill than that used in typical check counterfeiting today.

A Proposed DACOM Architecture

The DACOM architecture may include four signal levels:
1. Signal level 1—DACOM present
2. Signal level 2—DACOM Confirmed
3. Signal level 3—DACOM data read
4. Signal level 4—Other features triggered Signal level 1 would need to have an external trigger such as a position on the MICR number line or an account number look-up. The MICR approach is preferred in that it does not require additional database look-up.

Signal level 2 would require a read for the digital watermark. The successful read itself would serve as the first level of authentication since a re-originated check would be unlikely to have the DACOM.

Signal level 3 would entail decoding of the DACOM payload to identify features that should be on the document, as well as any linking information that might also be associated with the document.

Signal level 4 would trigger any additional processes associated with the document being verified. For example, a search and decoding of a 2-D barcode (for check alteration) to may be triggered at this point. This is not to say that the feature could not be otherwise triggered, but that it will be more efficient to search for the feature in a document where it is known to exist.

The DACOM Protocol

The DACOM protocol preferably includes an extensible protocol that, as a starting point, may contain one or more of the following fields.

| Field Name (QTY) | Sub-Field (QTY) | Description |
| --- | --- | --- |
| Protocol Enumerate (1) | | Fixed field that describes and defines the remaining fields and how to decode them from the bits extracted from the watermark. |
| Document Meta-data (1) | | Document meta data consisting of basic descriptors such as basic color, logo placement, etc. This could be used with visual inspection to check for certain visual discrepancies in the document. Note that a document re-origination without DACOM would not be caught through this feature set, but the lack of DACOM itself would signal a false document. |
| Digital Feature Parameter Block (N) | Priority (1) | Priority/Confidence in this Digital Feature. This may play a role in informing the DACOM state machine at detection as to how it should weight various features. |
| | Trigger (1) | Digital feature mediation trigger signaling that one ore more registered features should be present in the document. The mediation trigger signals the detection/read function for that feature that it should begin its process. |
| | Digital Feature Parameter (N) | Each Digital Feature may have one or more parameters needed to assist in the analysis of the feature. The parameters themselves may be located in this field or a key to lookup the parameters in a database. |
| | Desired Action (N) | Prioritized list of desired actions to be taken based on results from analysis of the Digital Feature. |
| | Feature Key (1) | Optional Key for Digital Feature, may be used to decrypt payloads, for database lookup, etc. |
| DACOM Central Database Lookup Trigger (1) | | DACOM central look-up requested. Trigger to indicate that the system should lookup the document based on the Document Identifier for further information and instructions. |
| MICR Validation Trigger (1) | | MICR central look-up requested to validate the MICR. This might be used in positive-pay systems |
| DACOM Document Identifier (1) | | A unique document code that can be used in conjunction with an external database to retrieve further document or account look-up information. |

DACOM Detection Architecture

The detection architecture is made up of three basic components, the DACOM Watermark Detector, State Machine and one or more Detection Feature Modules. Each component may be from different suppliers and tuned for specific detection environments (high-speed, POS, etc.). FIG. 19 is a diagram illustrating architecture using digital watermarks on documents as on-board mediators for authentication.

DACOM Integration Into Imaging Workflows

The architecture shown in FIG. 19 may be integrated in many different places in an existing imaging workflow. One example of such a workflow for checks is illustrated in FIG. 20. At a high level, checks processing imaging systems include the following components (and sub-components):

1. Imaging Device (operating real-time)
   a. Image Sensor (CCD, etc.)
   b. Imager Control Logic. Low level logic to control sensor, may perform any number of functions such as clocking data out of sensor, auto gain control, etc.
   c. Real-Time Image Enhancement. For high-speed imagers, this might include correcting rotation, or a Dynamic Contrast Algorithm to highlight certain check features.
2. Image Server (may receive images real-time, also allows off-line processing)
   a. Image Database to store images and any associated meta-data.
   b. Off-line analysis or interrogation of database.
3. Financial Transaction Network
   a. Network of interconnected systems used to transfer credits & debits between various constituent financial institutions and their customers.

A DACOM Detection system can be implemented as either a monolithic or distributed system within or spread throughout various imaging workflows.

Moreover, the use of the system is not limited to checks, but instead, can be used in imaging systems used to process, and more specifically, to authenticate documents. Another example is an identification document, which typically has layers of security features, such as digital watermarks, bar codes, magnetic stripes, holograms, smart cards, RF ID, etc. The DACOM watermark enables the reader system to coordinate authentication of all of these features, as well as trigger other actions, such as database retrievals, database authentication operations, biometric verification among the following sources of biometric information: biometric information derived from the document (e.g., facial image on card, or biometric information in machine readable code on card) biometric derived in real time from the bearer of the document, and biometric information extracted from a biometric database.

Integration with MICR Reader

Digital watermark reading may be integrated within existing reader devices. For checks and financial documents, one such device is a MICR imager. Another is a magnetic stripe reader. For point of sale applications, MICR imager, such as a MICRimager from Magtek, may be integrated with an image capture device (e.g., CCD sensor array) for capturing an image from which a digital watermark is extracted. An example of such an imager is a fixed focal plane skew corrected image sensor.

For additional functionality, the reader can also be equipped with a magnetic stripe reader adapted to extract a security feature called a Magneprint. This Magneprint feature is a unique "fingerprint" of a particular magnetic stripe. In one implementation, it carries information that is used to query a database that associates fingerprint information extracted from the magnetic stripe with the card. This association between the card and stripe fingerprint can be registered at the time of card issuance, in the case of card related documents.

The combined DWM, MICR, and Magneprint reader performs either on-line or off-line authentication and verification of the document. This reading and verification can be performed in a Point of Sale terminal. Off-line verification (verification without reference to external database) is performed by cross-checking information among the digital watermark, Magneprint, and/or MICR through shared message information or functionally related message information (e.g., one is a hash of the other, one is a checksum for the other, etc.). If the predetermined relationship or interdependency between watermark, MICR, and/or Magneprint information is not maintained, the reader deems the document to be invalid. On-line verification may be performed using the MICR, Magneprint, and/or watermark to index database entries for additional information for comparison.

The MICR/magnetic stripe/digital watermark imager may be integrated with other reader devices, such as a bar code reader, smart card reader, laser reader (e.g., for hologram or kinegram embedded information). Imaging can be performed by card transition across an aligned and illuminated linear scan element, or by means of a focused imaging array of sufficient resolution.

Digital Watermarks for Managing Quality of Imaging Systems

In Ser. No. 09/951,143, which is hereby incorporated by reference, we described the use of digital watermarks to measure quality of a particular video or document channel through the use of digital watermark metrics. This particular method may be specifically applied in the context of imaging systems used for documents like checks. With the advent of the check truncation act, the emphasis on quality and uniformity of image capture of check documents is going to increase. Digital watermark metrics, and specifically, some of the watermark metrics described in this document, may be used to monitor the quality of an imaging system, and make sure that scanners that do not fall within a predetermined operating range are detected and calibrated properly.

Previously, calibration is performed by passing test images through an imaging system. However, using digital watermarks associated with quality metrics, there is no longer a need to rely only on test patterns. In the case of checks, arbitrary check designs can be created, each having standard embedded digital watermarks used for quality measurement. Within the system, the watermark detector measures the quality of check images based on metrics extracted from the digital watermark embedded in the check images.

There are a variety of ways to measure image quality. One way is to design the watermark signal so that it is tuned to measure the modulation transfer function of the scanner. One specific example is that the watermark can be used to detect when the frequency response of the scanner has moved outside predetermined ranges. In particular, the frequency characteristics of the watermark, such as the peaks in the synchronization signal or other frequency domain attributes can be measured to detect: change in peak sharpness, and missing peaks or missing watermark signal elements. Similarly watermark message payloads can be redundantly embedded at different frequencies, and the amount of payload recovery at each frequency can be used as a metric to measure frequency response of the scanner and detect when it is out of range.

Another approach is to use the digital watermark to measure tonal response. Scanners tend to have a non-linear tonal response due to gamma correction, etc. The tone levels can be quantized into levels between some predetermined ranges, e.g., 0-127, and 128-255. Then the digital watermark signal can be quantized, or in turn, quantize features of the host image of the document such that it is concentrated at varying tonal levels for these ranges, such as at level 64 for the first range and 192 for the second range. The distortion of the watermark at these tonal levels indicates how the scanner is distorting the dynamic range for the particular tonal regions. In one particular implementation, the digital watermark, or watermarked image is created to have a distinct histogram peaks at various tonal ranges. Distortions of these peaks beyond certain thresholds is an indicator that the scanner is out range and needs to be re-calibrated.

The digital watermark provides an advantage in that it can carry and measure this form of scanner quality metric, and indicate when scanners need to be updated.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method, comprising:
    determining, using a computing device, whether a machine-readable auxiliary signal is embedded in an image of a printed object, wherein determining comprises detecting at least one of a divergence or convergence of at least one characteristic of a set of two or more print structures embedded in the printed object such that the machine-readable auxiliary signal becomes one of more or less detectable, wherein the at least one characteristic changes a detection zone of the auxiliary signal in the image based on the at least one characteristic having a gray level value that varies as a function of location in the printed object; and
    evaluating the machine-readable auxiliary signal, using the computing device, to determine whether the printed object is an original version of the printed object.

2. The method of claim 1, wherein the set of two or more print structures comprises a first color and a second color that change differently in response to a copy operation.

3. The method of claim 2, wherein at least one of the colors corresponds to an ink color that is out of gamut of at least one of a printer or scanner.

4. The method of claim 2, wherein a difference in luminance of the colors changes in response to the copy operation.

5. The method of claim 1, wherein the set of two or more print structures comprises a first print structure having a first dot gain characteristic and a second print structure having a second dot gain characteristic, wherein the first print structure is more susceptible to dot gain than the second print structure in response to a copy operation.

6. The method of claim 1, wherein a difference in luminance of the set of two or more print structures changes in response to a copy operation due to a difference in susceptibility to dot gain of the set of two or more print structures.

7. The method of claim 1, wherein the set of two or more print structures comprises a first print structure having a first aliasing characteristic and a second print structure having a second aliasing characteristic, wherein the first print structure aliases differently than the second print structure.

8. The method of claim 1, wherein the machine-readable auxiliary signal is embedded by varying continuity of line structures.

9. The method of claim 1, wherein one print structure comprises a line segment in a first color, and another print structure comprises a line segment in a second color, wherein the first color is different than the second color.

10. The method of claim 9, wherein the line segments of the different colors are generated by varying between the first color and the second color along a printed line.

11. The method of claim 1, wherein the evaluating comprises evaluating a frequency domain metric to detect changes in the print structures.

12. The method of claim 11, wherein the frequency domain metric is a radial frequency domain metric.

13. The method of claim 11, wherein evaluating the frequency domain metric comprises evaluating changes in color of a print structure.

14. A non-transitory computer-readable medium having instructions stored thereon, the instructions comprising:
    instructions to determine whether a machine-readable auxiliary signal is embedded in an image of a printed object, wherein determining comprises detecting at least one of a divergence or convergence of at least one characteristic of a set of two or more print structures embedded in the printed object such that the machine-readable auxiliary signal becomes one of more or less detectable, wherein the at least one characteristic of the print structures changes a detection zone of the auxiliary signal in the image based on the at least one characteristic having a gray level value that varies as a function of location in the printed object; and
    instructions to evaluate the machine-readable auxiliary signal to determine whether the printed object is an original version.

15. The non-transitory computer-readable medium of claim 14, wherein the set of two or more print structures comprises a first color and a second color that change differently in response to a copy operation.

16. A method comprising:
    embedding, using a computing device, a machine-readable auxiliary signal in an image at embedding locations using at least one print structure wherein embedding comprises configuring the at least one print structure to change a detection zone of the auxiliary signal in the image, wherein the change causes at least one of a divergence or convergence of at least one characteristic of the at least one print structure such that the machine-readable auxiliary signal becomes one of more or less detectable, and wherein the change is based on the at least one characteristic having a gray level value that varies as a function of location in the image; and creating a metric based at least in part on the machine-readable auxiliary signal embedded in the image, using a computing device, to facilitate detection of the convergence or divergence from a scanned image of a suspect printed object to determine whether the suspect printed object is a copy of a printed object.

17. A non-transitory computer-readable medium having instructions stored thereon, the instructions comprising:
instructions to embed a machine-readable auxiliary signal in an image at embedding locations using at least one print structure wherein embedding comprises configuring the at least one print structure to change a detection zone of the auxiliary signal in the image, wherein the change causes at least one of a divergence or convergence of at least one characteristic of the at least one print structure such that the machine-readable auxiliary signal becomes one of more or less detectable, and wherein the change is based on the at least one characteristic having a gray level value that varies as a function of location in the image; and
instructions to create a metric, based in part on the machine-readable auxiliary signal embedded in the image, to facilitate detection of the convergence or divergence from a scanned image of a suspect printed object to determine whether the suspect printed object is a copy.

18. A method, comprising:
determining, using a computing device, whether a machine-readable auxiliary signal is embedded in an image of a printed object, wherein determining comprises detecting at least one of a divergence or convergence of at least one characteristic of at least one print structure embedded in the printed object such that the machine-readable auxiliary signal becomes one of more or less detectable, wherein the at least one characteristic of the at least one print structure changes a detection zone of the auxiliary signal in the image based on the at least one characteristic having a gray level value that varies as a function of location in the printed object, and wherein the at least one print structure comprises a color; and
determining, based on evaluating the machine-readable auxiliary signal, using a computing device, whether the printed object is an original version of the printed object.

19. The method of claim 18, wherein the machine-readable auxiliary signal is embedded by varying continuity of line structures.

20. A non-transitory computer-readable medium having instructions stored thereon, the instructions comprising:
instructions to determine whether a machine-readable auxiliary signal is embedded in an image of a printed object, wherein determining comprises detecting at least one of a divergence or convergence of at least one characteristic of the at least one print structure embedded in the printed object such that the machine-readable auxiliary signal becomes one of more or less detectable, wherein the at least one characteristic of the at least one print structure changes a detection zone of the auxiliary signal in the image based on the at least one characteristic having a gray level value that varies as a function of location in the printed object, and wherein the at least one print structure comprises a color; and
instructions to determine, based on evaluating the machine-readable auxiliary signal, whether the printed object is an original version of the printed object.

21. The non-transitory computer-readable medium of claim 20, wherein the machine-readable auxiliary signal is embedded by varying continuity of line structures.

22. A device comprising:
a memory configured to store an image of a printed object; and
a processor operatively coupled to the memory and configured to:
determine whether a machine-readable auxiliary signal is embedded in the image of the printed object, wherein determining comprises detecting at least one of a divergence or convergence of at least one characteristic of a set of two or more print structures embedded in the printed object such that the machine-readable auxiliary signal becomes one of more or less detectable, wherein the at least one characteristic of the print structures changes a detection zone of the auxiliary signal in the image based on the at least one characteristic having a gray level value that varies as a function of location in the printed object; and
evaluate the machine-readable auxiliary signal to determine whether the printed object is an original version of the printed object.

23. A device comprising:
a memory configured to store an image; and
a processor operatively coupled to the memory and configured to:
embed a machine-readable auxiliary signal in an image at embedding locations using at least one print structure, and wherein embedding comprises configuring the at least one print structure to change a detection zone of the auxiliary signal in the image, wherein the change causes at least one of a divergence or convergence of at least one characteristic of the at least one print structure such that the machine-readable auxiliary signal becomes one of more or less detectable, and wherein the change is based on the at least one characteristic having a gray level value that varies as a function of location in the image; and
create a metric, based at least in part on the machine-readable auxiliary signal embedded in the image, to facilitate detection of the convergence or divergence from a scanned image of a suspect printed object to determine whether the suspect printed object is a copy.

24. A device comprising:
a memory configured to store an image of a printed object; and
a processor operatively coupled to the memory and configured to:
determine whether a machine-readable auxiliary signal is embedded in the image, wherein determining comprises detecting at least one of a divergence or convergence of at least one characteristic of at least one print structure embedded in the printed object such that the machine-readable auxiliary signal becomes one of more or less detectable, wherein the at least one characteristic of the at least one print structure changes a detection zone of the auxiliary signal in the image based on the at least one characteristic having a gray level value that varies as a function of location in the image, and wherein the at least one print structure comprises a color; and
determine, based on evaluating the machine-readable auxiliary signal, whether the printed object is an original version of the printed object.

* * * * *

UNITED STATES PATENT AND TRADEMARK OFFICE
CERTIFICATE OF CORRECTION

| | |
|---|---|
| PATENT NO. | : 8,144,368 B2 |
| APPLICATION NO. | : 10/723181 |
| DATED | : March 27, 2012 |
| INVENTOR(S) | : Rodriguez et al. |

It is certified that error appears in the above-identified patent and that said Letters Patent is hereby corrected as shown below:

On the Title Page, in Item (73), under "Assignee", in Column 1, Line 1, delete "Coporation" and insert -- Corporation --, therefor.

On the Title Page, in Item (57), under "ABSTRACT", in Column 2, Line 3, delete "on" and insert -- an --, therefor.

In Column 8, Line 17, delete "readable" and insert -- readable. --, therefor.

In Column 9, Line 38, delete "(constant tone)" and insert -- (constant tone). --, therefor.

In Column 13, Line 13, delete "theses" and insert -- these --, therefor.

In Column 13, Line 16, delete "such at" and insert -- such as --, therefor.

In Column 15, Line 23, delete "classifer" and insert -- classifier --, therefor.

In Column 16, Line 8, delete "traning" and insert -- training --, therefor.

In Column 17, Line 43, delete "cases-" and insert -- cases: --, therefor.

In Column 18, Line 21, delete "counterfeits" and insert -- counterfeits. --, therefor.

In Column 20, Line 6, delete "IRD." and insert -- IRD --, therefor.

In Column 20, Line 13, delete "ERDs" and insert -- IRDs --, therefor.

In Column 21, Line 41, delete "scanner;" and insert -- scanner, --, therefor.

Signed and Sealed this
Sixteenth Day of October, 2012

David J. Kappos
*Director of the United States Patent and Trademark Office*

CERTIFICATE OF CORRECTION (continued)
U.S. Pat. No. 8,144,368 B2

In Column 24, In Table, under "Description", in Line 13, delete "one ore more" and insert -- one or more --, therefor.

In Column 25, Line 57, delete "MICRimager" and insert -- MICR imager --, therefor.